US012280879B1

(12) United States Patent
Antonio

(10) Patent No.: US 12,280,879 B1
(45) Date of Patent: Apr. 22, 2025

(54) GRAVITY FORCE ABSORBERS FOR FALL PROTECTION

(71) Applicant: Ishmael Antonio, Rio Rancho, NM (US)

(72) Inventor: Ishmael Antonio, Rio Rancho, NM (US)

( * ) Notice: Subject to any disclaimer, the term of this patent is extended or adjusted under 35 U.S.C. 154(b) by 0 days.

(21) Appl. No.: 18/675,883

(22) Filed: May 28, 2024

Related U.S. Application Data

(63) Continuation of application No. 18/077,010, filed on Dec. 7, 2022, now Pat. No. 12,017,780, which is a continuation-in-part of application No. 17/337,728, filed on Jun. 3, 2021, now Pat. No. 11,554,869.

(60) Provisional application No. 63/079,261, filed on Sep. 16, 2020.

(51) Int. Cl.
*B64D 17/36* (2006.01)
*B64D 17/30* (2006.01)

(52) U.S. Cl.
CPC ............. *B64D 17/36* (2013.01); *B64D 17/30* (2013.01)

(58) Field of Classification Search
CPC ........ B64D 17/36; B64D 17/30; B64D 17/38; B64D 17/22
See application file for complete search history.

(56) References Cited

U.S. PATENT DOCUMENTS

| | | | | |
|---|---|---|---|---|
| 2,352,036 A | * | 6/1944 | Tauty | B60R 22/28 297/472 |
| 2,471,166 A | * | 5/1949 | Neff | D03D 11/00 244/151 R |
| 2,526,264 A | * | 10/1950 | Neff | D04B 21/08 66/193 |
| 2,578,753 A | * | 12/1951 | Smith | B64D 17/36 242/153 |
| 4,446,944 A | * | 5/1984 | Forrest | A62B 35/04 182/3 |

FOREIGN PATENT DOCUMENTS

GB 191508649 A * 6/1915

* cited by examiner

*Primary Examiner* — Justin M Benedik
(74) *Attorney, Agent, or Firm* — Rod D. Baker

(57) ABSTRACT

A fall protection system and method, particularly for attenuating shocks transmitted to a person's body by a safety line, such as a rope or cable, after a fall or while being deliberately lowered from an overhead anchor point. A shock absorber assembly is incorporated in or on the safety line, deployed between the person and the safety line anchor point.

11 Claims, 17 Drawing Sheets

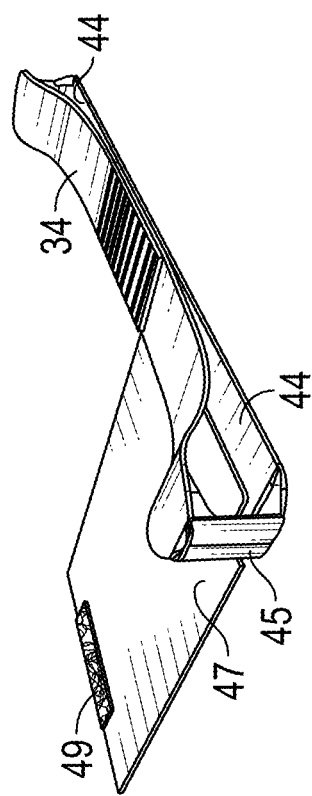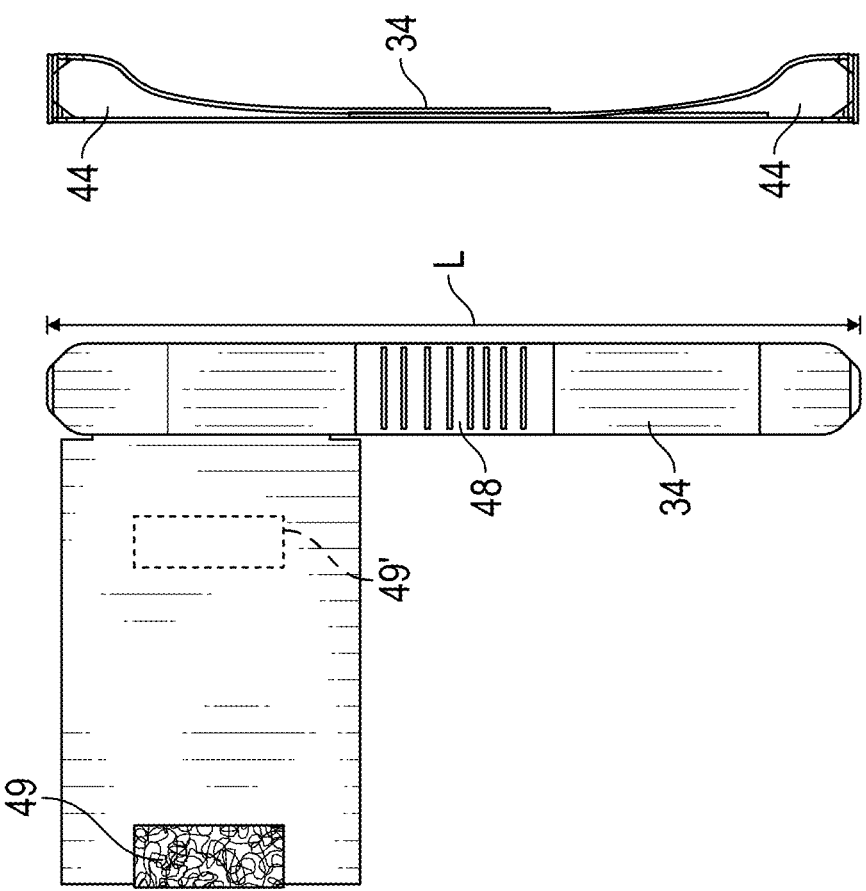

GRAVITY FORCE ABSORBERS FOR FALL PROTECTION

CROSS-REFERENCE TO RELATED APPLICATIONS

This application is a continuation of U.S. Utility patent application Ser. No. 18/077,010 titled "Gravity Force Absorber Systems," and filed Dec. 7, 2022, which was a continuation-in-part of U.S. patent application Ser. No. 17/337,728 titled "Gravity Force Absorber for Use in Certain Parachute and Other Systems" filed on Jun. 3, 2021 (now U.S. Pat. No. 11,554,869), which claimed the benefit of the filing of U.S. Provisional Patent Application Ser. No. 63/079,261 titled "Gravity Force Absorber for Use in Certain Parachute and Other Systems," filed on Sep. 16, 2020; the entire respective disclosures of which are incorporated herein by reference.

BACKGROUND OF THE INVENTION

Field of the Invention

This invention relates to shock absorbers, particularly for absorbing and dampening shocks due to certain parachuting, climbing, and rope/cable use activities, and most specifically to a shock absorber for use with climbing, industrial workplace, and certain hoisting activities, or with tethered tandem bundles in parachuting activity, particularly in certain military tandem bundle jump operations.

Background

People have been parachuting from aircraft, such as airplanes, helicopters, and balloons, for at least a hundred years. Parachuting is done for sport as well as for a variety of important utilitarian reasons. Non-sport, utilitarian parachuting is essential to certain military airborne missions, for example. Parachuting activity also sometimes is undertaken in selected law enforcement and/or search and rescue efforts and actions. In certain parachuting situations, principally in specialized airborne military special operations, there is a need for the person parachuting (hereinafter the "paratrooper") from an aircraft to be accompanied directly by a sizeable cargo. "Cargo" herein refers to large bundles of equipment or matériel, not to include ordinary backpacks or auxiliary "belly-packs" releasably attached directly to the paratrooper's body.

It is desired that the paratrooper and the cargo exit the aircraft at about the same time, and that the paratrooper and the cargo be connected together so as not to become distantly separated in the course of the air drop. It is known to have the cargo (which is typically contained in a cylindrical container) connected or "tethered" to the paratrooper, so that the cargo descends simultaneously with the paratrooper by means of a shared main parachute. A parachuting situation involving a paratrooper accompanied by a separate but connected cargo container sometimes is called a "tethered tandem bundle jump" or a "tandem cargo jump," or similar. A paratrooper wears a heavy duty main harness (including leg straps) to which the parachute system is reliably secured. The parachute system's main components are the main parachute assembly including the canopy, skirt, and suspension lines, and the links and risers which connect the suspension lines to the trooper's main harness. A tandem parachute system typically also includes a drogue chute (deployed shortly after exiting the aircraft) connected via bridle to the main parachute; the paratrooper pulls the drogue release which actuates the main parachute. In a tandem cargo jump scenario, the cargo container is also securely connected to the paratrooper's main harness by means of a high tensile strength tether, rope or cable. Thus, sometime after the main parachute has been deployed and the canopy opened, the cargo dangles below the paratrooper by means of the cargo tether, while the paratrooper is suspended below the main parachute canopy by means of the parachute system's suspension lines, links and risers, which are connected to the main harness attached on and around the trooper's torso and shoulders.

A significant, and potentially harmful, consequence of a tethered tandem bundle jump is the tremendous shock forces imparted to the falling paratrooper's body during the course of a jump. Even in an ordinary parachute jump with no large cargo bundle, a paratrooper is subjected to at least one significant shock, the "opening shock" of the rapid deceleration of the user's body resulting from the sudden braking effect of the opening of the main canopy. The magnitude of the opening shock is highly variable due to a variety of factors. Also, particularly in the case of a parachute jump involving the use of a static line (known in the art) to automatically deploy the parachute, the user may undergo a substantial "exit shock" when the static line reaches full extension (e.g., about twelve feet) to begin pulling upon the user's parachute system backpack. Besides increased opening and exit shocks, in a tethered tandem cargo jump, other potentially harmful shocks frequently are transmitted (via the cargo tether) to the user due to the added effects of the falling heavy cargo bundle.

When a paratrooper undertakes a tethered tandem cargo jump, he and the cargo exit the aircraft at around the same time. The cargo container, however, often accelerates to fall faster due to its more aerodynamic shape and the relatively greater wind resistance upon the paratrooper; the paratrooper's body reaches terminal velocity sooner. Consequently, soon after leaving the aircraft and well before his main canopy has begun to open, the paratrooper frequently feels a first shock due to the cargo having fallen faster and reached the full extent of the cargo tether. The cargo tether, extending down from the falling paratrooper to the cargo below, is abruptly pulled taut by the weight of the falling cargo, as the slower-falling paratrooper curtails the velocity of the cargo. The resulting jolt is transmitted through the tether to the paratrooper's main harness and thus to the paratrooper's body. This first shock may be rapidly repeated one or more times (although at reduced magnitude) as the cargo "bounces" at the lower end of the tether. (It is desirable to damp the amplitude of such oscillatory bounces.) The paratrooper and cargo then continue falling together and at approximately the same speed (but not necessarily with the cargo tether completely extended). After some measured or selected time of free fall, the paratrooper actuates his parachute. Shortly after parachute deployment, the main canopy opens fully, and serves its purpose to slow the fall of the paratrooper's body. As the main canopy opens, the paratrooper falls further downward to the full length extent of the parachute's suspension lines and risers, and then experiences the "opening shock" common to all parachute jumps. However, in the instance of a tandem cargo jump, the cargo itself undergoes a separate deceleration due to the braking effect of the open canopy. This cargo opening shock is transmitted from the suddenly arrested cargo to the paratrooper's harness via the cargo tether. The magnitude of this cargo opening shock cannot be discounted, and can be quite large especially if the cargo is heavy and the cargo tether is anything less than taut at the time the paratrooper himself feels the initial opening shock. In some cases, the cargo falls a considerable distance in a short time after the paratrooper experiences canopy opening shock. This second or cargo opening shock, realized when the cargo tether again obtains its full extension and goes into tremendous tension, can convey a formidable jolt or shock force to the paratrooper.

The various shock forces described above are significant under ideal conditions, and can be enormously exaggerated by various factors including the weight, size, and aerodynamic shape of the cargo, the time period of free fall, the length of the cargo tether, the type of parachute system, winds aloft, etc. The shocks transmitted to a paratrooper's body can be, and have been known to be, harmful (even crippling) to paratroopers in the line of duty. Even skilled paratroopers using superior parachute systems, harnesses, and related equipment are prone to suffer adverse effects to their health-most especially to the muscles, bones, and connective tissues of their backs, necks, and shoulders-after having performed numerous tethered tandem bundle jumps in the course of years of dedicated service.

It likewise is true that there on occasion is a similar need to protect the cargo itself from the shocks and decelerations due to a parachute drop, including when the cargo is the object of an unmanned drop. As is known, various cargoes may be dropped by parachute from aircraft, unaccompanied by a human parachutist or paratrooper. Such cargoes may be of any of a wide variety of types and weights. It is always preferable, sometimes relatively important, to minimize the impacts and shocks of a parachute drop upon such a cargo. Thus, it is desirable to provide shock absorption for the cargo even when it is the parcel of an unmanned drop.

There is an unmet need to reduce the wear and tear on a paratrooper's body attributable to the shock forces associated with an airborne tethered tandem bundle jump. Likewise, shock absorption for an unmanned cargo drop is desirable. With the foregoing background, the presently disclosed invention was developed. Particularly, there is disclosed a system and apparatus for absorbing and attenuating the shock forces, including opening shock forces, transmitted to a paratrooper's body during the execution of a tandem cargo parachute jump. Moreover, an absorber assembly according to the present disclosure also can prolong the life and use of the entire parachute canopy system.

There also similarly is an unmet need to provide improved fall shock absorption, often called fall protection, in other contexts including military, recreational, and tactical situations. For example, there is a need for simple and reliable shock absorption in operations involving the use of ropes or cables, such as in certain industrial settings and when persons are hoisted to or from an overhead location or anchor point, such as in a hovering helicopter or building. When a person is attached in a harness and engaged with a rope/cable, and the rope/cable may be a safety rope/cable connected to an anchor point on a building, or the ground, or an aircraft, or the like, there is a need to absorb the shock to the user's body, and/or to the anchor point or anchor device, at the instant the rope/cable jerks or arrests a fall, such as an accidental fall.

SUMMARY OF THE INVENTION

There are disclosed a fall protection method and system. The system has a rope or cable having a first end and a second end, the second end of the rope or cable attachable to an anchor point, the rope or cable defining a force line extending along a length of the rope or cable between the first end and the second end, and means for attaching the first end of a rope or cable to the person. The system features a shock absorber assembly, incorporated within the force line, comprising at least one stretchable absorber unit including a first end attachment portion, a second end attachment portion, at least one fastener aperture defined through the first end attachment portion, at least one other fastener aperture defined through the second end attachment portion, and at least three parallel intermediate joinder sections integrally joining and extending between the first end attachment portion and the second end attachment portion.

The method includes the steps of attaching a first end of a rope or cable to a person, and attaching a second end of the rope or cable to an anchor point, with the rope or cable defining a force line extending along a length of the rope or cable between the first end and the second end. There also are steps of incorporating within the force line a shock absorber assembly, and providing the shock absorber assembly with at least one stretchable absorber unit. The provided absorber unit has a first end attachment portion, a second end attachment portion, at least one fastener aperture defined through the first end attachment portion, at least one other fastener aperture defined through the second end attachment portion, and at least three parallel intermediate joinder sections integrally joining and extending between the first end attachment portion and the second end attachment portion.

Other aspects, advantages, and applications are disclosed and claimed hereinafter, as this summary is not limiting of the invention.

BRIEF DESCRIPTION OF THE DRAWINGS

The attached drawings, which form part of this disclosure, are as follows:

FIG. 4A is a plan view of a limiter strap and wrap flap assemblage useable in the system and apparatus of the present invention, the strap and flap both being unfurled;

FIG. 4B is a side view of the limiter strap and wrap flap assemblage seen in FIG. 4A;

FIG. 4C is a perspective view of the strap and wrap flap assemblage seen in FIG. 4A;

Like elements are labeled with like numerals in the several views; the drawings are not necessarily to scale, within a view or relative to each other.

DETAILED DESCRIPTION OF THE INVENTION

This invention relates to shock absorption, primarily to an apparatus system for absorbing and/or dampening the shocks to the body of a person parachuting from an aircraft. However, the invention may be put to other practical uses where shock absorption is desired, including fall protection for persons (e.g., persons rappelling), and shock absorption in unmanned cargo parachute drops. Further, a shock absorber assembly according to this disclosure may find use in the tying-down and security of cargo as with ropes and nets, or the like.

Nevertheless, the disclosed apparatus and system find specific use in the performance of a tethered tandem bundle parachute jump, in which a person parachuting from a flying aircraft is accompanied in the jump by a cargo bundle tethered to the user's parachute harness. Tandem cargo parachute jumps subject a person's body, particularly his or her spine, neck and/or shoulders, to one or more significant jolting forces due to the shocks associated with the operations of the parachute system and the presence of the added cargo load. Besides reducing shocks to the parachuting person's body, the present system also beneficially ameliorates corresponding and associated shocks to the cargo bundle and the user's parachute system overall. The present system is devised to decrease the severity of these shocks.

Currently, extra robust parachute systems, including reinforced canopies, may be required when a tandem bundle jump is to be undertaken. Use of the presently disclosed absorber assembly may eliminate the need to use such specialized heavy duty parachute systems, as reduced shocks are imparted to the chute system. A substantial advantage of the present apparatus and system is that they act to ameliorate shocks and jolts to a paratrooper throughout the duration of a tethered tandem cargo jump—from the initial "tether snatch" to touchdown landing.

Figure 1:
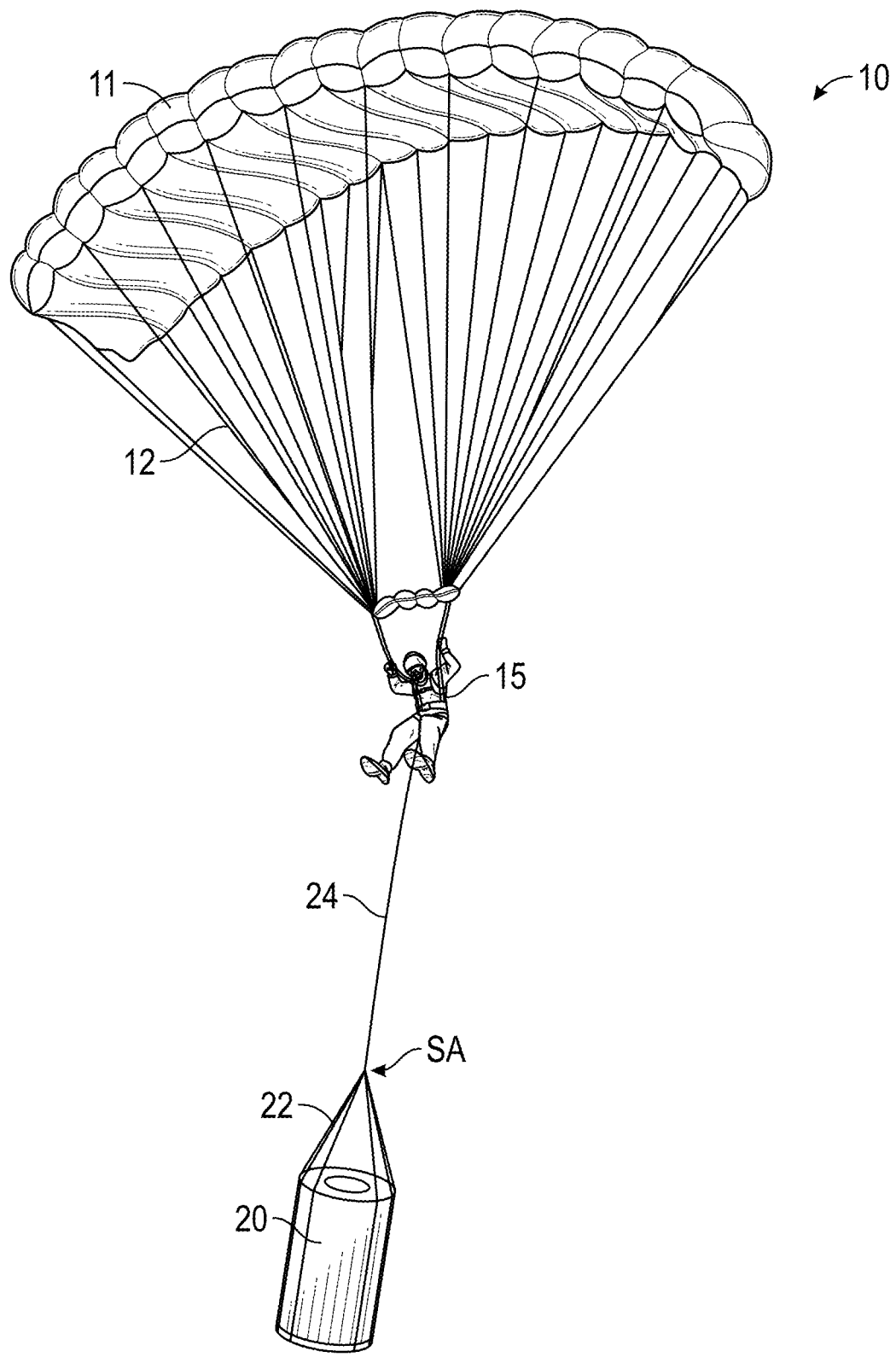
FIG. 1 is a side view of a person parachuting down through the air during a tethered tandem cargo jump, and illustrating generally a use of a system according to the present invention.

Reference is made to FIG. 1. In a tethered tandem bundle or cargo parachute jump, a parachute system 10 including a canopy 11 and suspension lines 12 slow the descent of the user 15 toward the surface of the Earth, generally in accordance with convention. The canopy 11 may be any type of canopy known or hereafter devised, including round, cruciform, or square/rectangular (e.g., ram air chute). The user 15 wears a known type of parachute harness which is secured to the parachute system 10 by means of risers (or equivalents); risers are strips of webbing (for example) joining the user's body harness and the rigging or suspension lines 12 of a parachute. The user 15 in this disclosure may be referred to as a "paratrooper," but so identifying the user does not restrict the invention solely to military applications. The system or apparatus according to this disclosure may find application in any circumstance involving a tandem bundle type of parachuting activity.

In a tethered tandem bundle jump, as suggested in FIG. 1, the paratrooper 15 is accompanied throughout the duration of the jump by a cargo 20. The cargo 20 typically is bundled or containerized in various ways known in this field of endeavor. In a typical military tethered tandem bundle jump, the cargo 20 may weigh as much as 300 pounds (lbs.), and often up to 700 lbs. The cargo 20 is flexibly and releasably, but reliably, connected to the paratrooper's body harness by means of a cargo tether 24, as known in the art. Currently, such conventional tethers 24 are typically about 19-20 feet in total length. A cargo 20 may have a (currently known in the art) harness 22 attached thereto, or some other means or container anchor for connecting the cargo tether 24 to the cargo 20. Such a cargo harness 22 may have three or four (as shown) or more straps for a stable connection between the cargo and the single-line cargo tether 24. A tether 24 is fabricated from materials, and according to specifications, configurations, and tensile strengths and elasticity, known currently in the specialized field of tandem bundle parachuting operations.

As explained hereinabove, during the course and serial stages of a tandem bundle jump, the parachute system 10, the user 15 (via his harness), the tether 24, and the cargo 20 are all subjected to substantial forces, when the suspension lines 12 and the cargo tether 24 abruptly obtain full tension extension and suddenly transmit high forces in the parachute system and to the user and the cargo. A paratrooper 15 ordinarily feels first the force of the "tether snatch" as the cargo 20 is ejected from the aircraft immediately before the paratrooper, and a pulling force is transmitted by the cargo to the paratrooper's harness. Tensile forces and jolts to the paratrooper continue thereafter, in varying amounts, throughout the duration of a jump from exit to freefall, to opening shock, to under canopy, to landing. After the initial full extensions (and resulting shocks) of the suspension lines 12 (e.g., beneath an open canopy 11) and of the cargo tether 24 (which full extensions do not necessarily occur simultaneously), the paratrooper 15 may "bounce" up-and-down upon the flexible and somewhat elastic suspension lines 12, while the cargo 20 may also bounce at the end of the flexibly and somewhat elastic cargo tether 24. These "bouncing" movements result in further repeated, although relatively diminished, shocks to the user, parachute system, and cargo.

The shock absorber assembly according to the present disclosure, to be described in detail hereinbelow, is installed between the paratrooper 15 and the cargo 20, so as to reduce shocks that otherwise would be transmitted between the cargo and the paratrooper via the cargo tether 24. The present shock absorber assembly potentially can be provided anywhere in, on, or along the train of components connecting the cargo 20 to the paratrooper 15, so to attenuate tension forces otherwise transmitted via the cargo tether 24. Preferably, however, the inventive shock absorber assembly is installed at or near the juncture, at location SA in FIG. 1, between the distal end of the cargo tether 24 and the cargo harness 22 (or other anchor to the cargo).

The present invention has been used advantageously to attenuate by approximately 20 percent the maximum forces transmitted though the parachute system as felt by the user or cargo. In one test, an 8 g acceleration was reduced by about 2 g.

Combined reference is invited to FIGS. 2-5, which considered collectively illustrate basics of the shock force absorber, or shock absorber assembly 30, according to the present invention. The shock absorber assembly 30 includes four principal components: at least one absorber unit 32 and/or 32', a limiter strap 34, and a pair of connectors 36. The connectors 36 most preferably are carabiners of construction and rating known in the field of tandem bundle parachuting, and may be of a "tri-link" type configuration. ("Tri-link" connectors in a highly technical sense are not true carabiners; a tri-link defines a somewhat triangular overall shape, has a screwed closure, and is preferred when tri-axial loading is expected, while conventional carabiners are devised for uniaxial loading on their spine side. Herein, however, the term "carabiner" shall include tri-links.) Connectors 36 are repeatedly openable and closeable, such that they can be opened for releasable engagement through a loop or aperture, and closed in a manner to provide temporary yet secure such engagement, as rated carabiners conventionally are. A preferable connector is 36 an extra-large steel auto three-stage locking carabiner that exceeds National Fire Protection Association (NFPA) requirements; suitable connectors 35 are "XL Steel Triple Lock" carabiners available from Mad Rock Climbing of Santa Fe Springs, California, USA. Or, a "tri-link" useable as a connector 36 is the "Delta EN" Maillon Rapide® link available from Peguet SA, of Annemasse, France. The connector carabiners 36 ideally are of a "triple action" type, i.e., three deliberate manipulative steps are necessary to open a securely closed carabiner (to prevent accidental opening).

Figure 11:
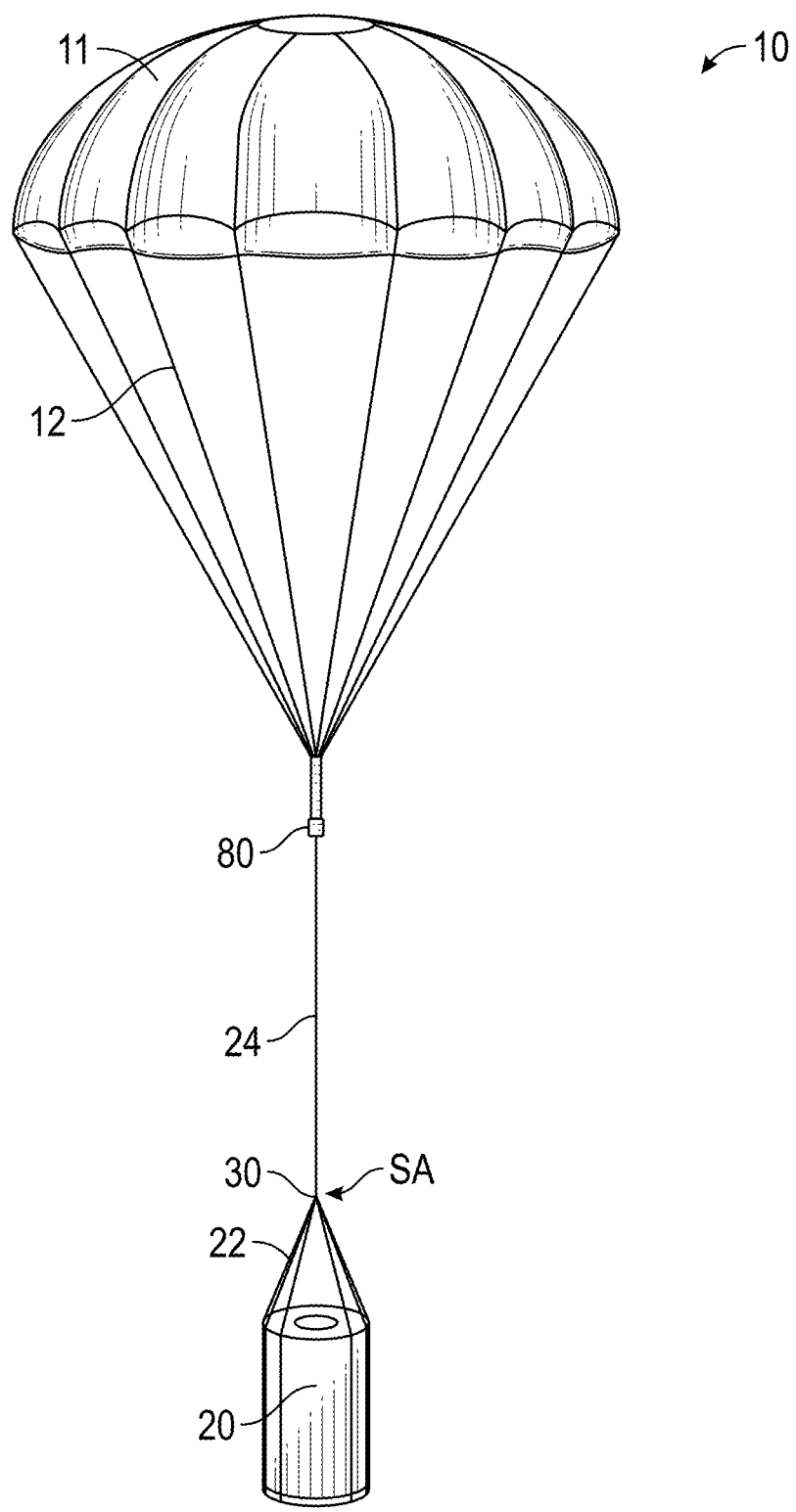
FIG. 11 is a view of the system according to the present invention, in use during a non-tandem, unmanned, parachute drop, to protect a cargo during the drop.

One or more (usually at least two, preferably three, rarely but sometimes four (e.g., FIGS. 6 and 7) absorber units 32, connected with at least one (ordinarily only one) limiter strap 34, by means of the two carabiners 36, constitute the basics of a shock absorber assembly 30 according to this disclosure. Two connectors, such as carabiners 36, are used in a complete shock absorber assembly 30; one on each end of the limiter strap 34 also engaged with a respective end of an absorber unit 32. A carabiner 36 is releasably but securely disposed through a loop 44 in a corresponding end of the limiter strap 34, and through a fastener aperture in a corresponding end of an absorber unit 32, to interconnect the limiter strap 34 and at least one absorber unit, in the manner suggested in FIG. 6. Importantly, when used in the context of a manned tethered tandem bundle jump, at least two absorber units 32 always are used. A user may selectively adapt the shock absorption capacity of an absorber assembly 30 by choosing an appropriate number and kind(s) of absorber units 32 to be used in the assembly, as explained further herein. Two or three absorber units 32, 32' (FIGS. 2, 3A, 3B and 3C) typically are used in a manned tethered tandem bundle jump. But four, or potentially even more, absorber units 32' may be employed in a shock absorber assembly 30 particularly in unmanned cargo drops as seen in FIG. 11.

Figure 2:
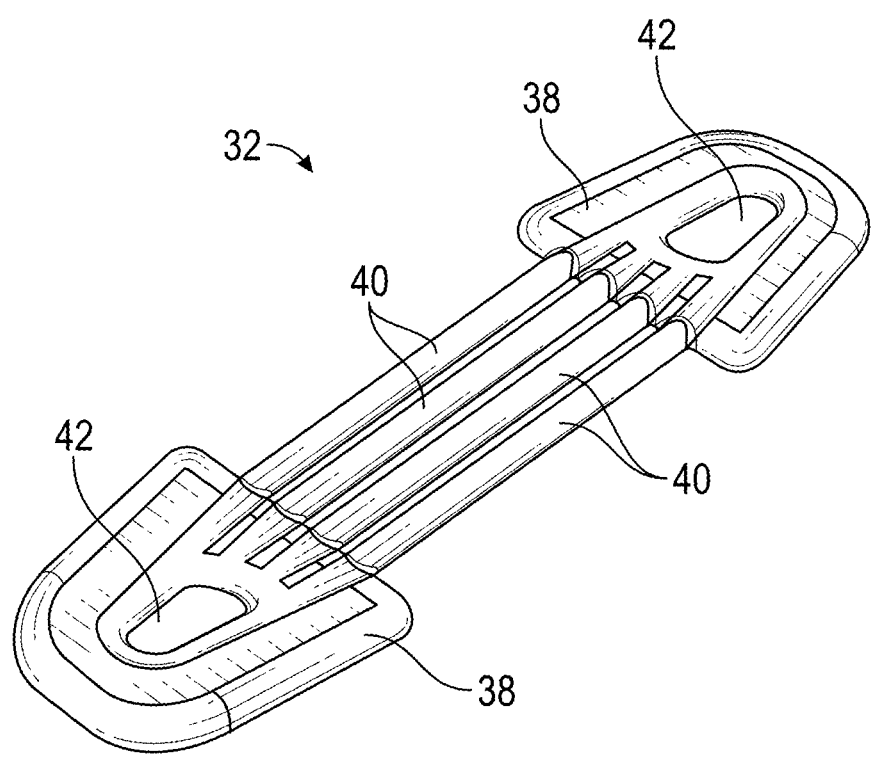
FIG. 2 is an enlarged perspective view of an absorber unit component, defining two fastener apertures therein, useable in the system and apparatus of the present invention.
Figure 3A:
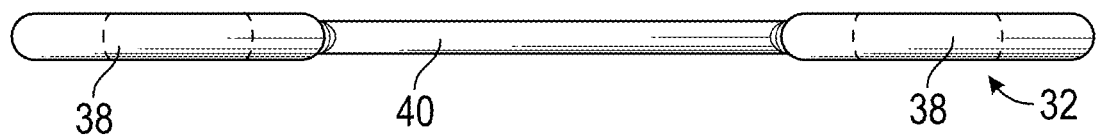
FIG. 3A is a side or edge view of the absorber unit seen in FIG. 2.
Figure 3B:
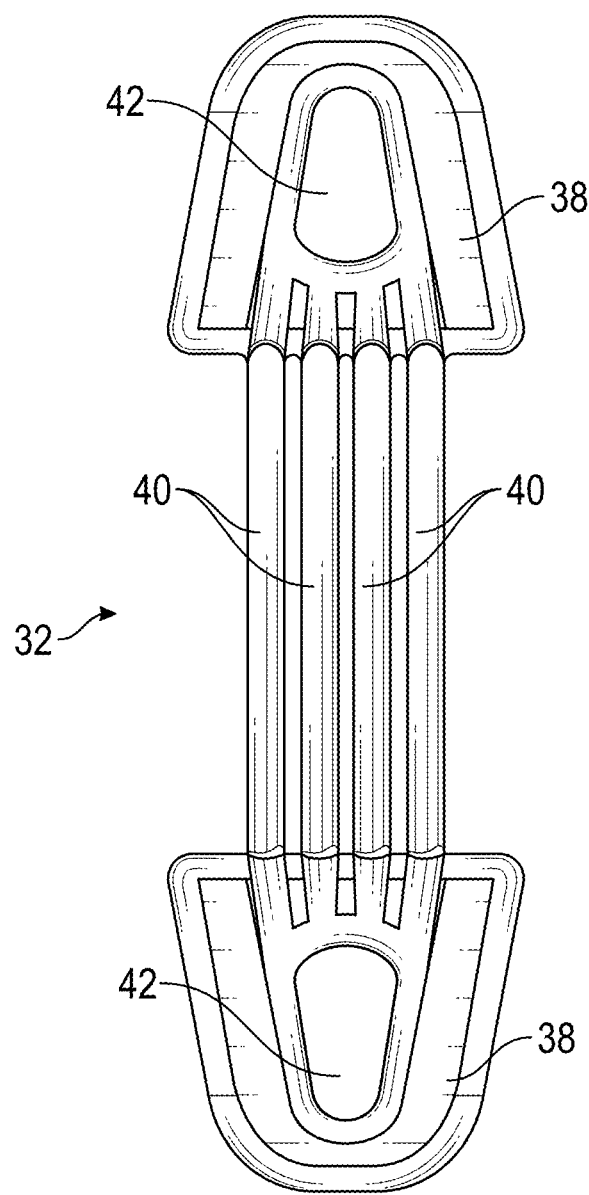
FIG. 3B is a plan view of the absorber unit seen in FIG. 2.

FIGS. 2, 3A, and 3B illustrate one preferred embodiment of an absorber unit 32 according to the present disclosure. An absorber unit 32 is molded from a stretchable, resilient, elastic, and durable thermoplastic, such as polyurethane; polyurethane advantageously is resistant to saltwater and chemicals. The absorber unit 32 is devised to stretch axially a considerable amount when under tension, so as to resiliently absorb applied tension forces. Absorber unit 32 typically has an axial length (at rest) of from about 6 inches to about 10 inches, and preferably is approximately 8 inches long. As suggested by FIG. 3A, the unit 32 is generally "flat" in its side and end views, and relatively thin in its thickness dimension; the thickness dimension typically is between 0.24 inches and about 0.34 inches. It may be about two inches wide, e.g., at the greatest widths of its end attachment portions 38. The absorber unit 32 by general example can stretch axially to about 34 or 35 inches before breaking, that is, the maximum stretched length is about 35 inches when unit failure is imminent.

An absorber unit 32 preferably is axially symmetrical, and comprises two opposing end attachment portions 38 joined by a plurality of intermediate joinder sections 40 extending between the end attachment portions. The absorber unit 32 is integrally molded from polyurethane elastomer, so that the distal attachment portions 38 and the joinder sections 40 are a single structural unit. The unit 32 has at least two, up to six, and very preferably four parallel intermediate joinder sections 40. The joinder sections 40 may be generally cylindrical, and their ends are securely integrated with the attachment portions 38. The incorporation of a plurality of relatively thinner cylindrical intermediate joinder sections 40 (rather than, e.g., a single thick joinder trunk) promotes the proper thermo-molding of the joinder sections while retaining their collective tensile strength. Moreover, a plurality of thinner intermediate joinder sections promotes the lateral bendability of an absorber unit 32, facilitating its manual bending and manipulation by a user. (See, e.g., FIG. 9.)

Figure 3C:
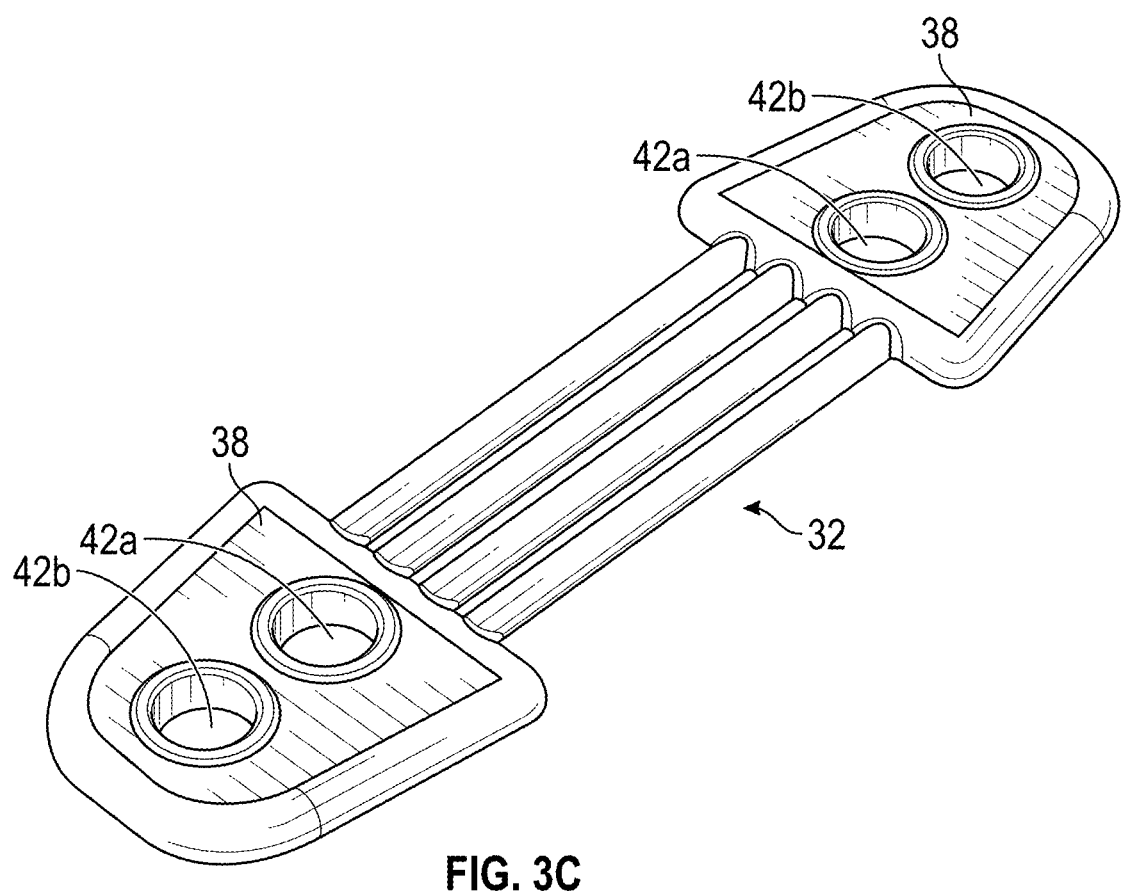
FIG. 3C is a perspective view of an alternative embodiment of an absorber unit, defining four fastener apertures therein, useable in a system and apparatus according to the present invention.

As seen in FIGS. 2, 3B and 3C, the attachment portions 38 each defines in plan view a sort of trapezoidal, or broadly rounded triangular shape, having its narrower width dimension at the end of the absorber unit 32. This shape has been determined to provide good strength performance, while also facilitating the easy insertion and closure of releasable connectors, such as carabiners, through a fastener aperture 42 and around the attachment portion 38. Each attachment portion 38 may have reinforcement ribs (not shown) corresponding to and in registration with the joinder sections 40. Each attachment portion 38 also preferably has a reinforcing rib running along its periphery, as indicated in FIGS. 2 and 3B. In this version of the absorber unit 32, each of the two attachment portions 38 is penetrated, near its center, by a fastener aperture 42 through which a connector carabiner 36 may be disposed.

Alternative versions of the absorber unit 32 may have more than two fastener apertures 42; FIG. 3C shows that, in alternative embodiments, an absorber unit 32' defines two fastener apertures in each corresponding attachment portion 38. There are seen in FIG. 3C two inner fastener apertures 42a and two outer fastener apertures 42b, with one of each defined through respective attachment portions 38 of the absorber unit 32'. Having four fastener apertures 42a,b in an absorber unit increases the versatility of the system, allowing a user to select from a variety of absorber units 32, 32' to customize the performance of the user's completed absorber assembly 30 to the demands of a particular tethered tandem bundle jump or other circumstance.

An absorber assembly 30 may include one or more absorber units selected from either or both of two types of absorber units 32 or 32'. The types are differentiated by, among other things, their elastic elongation response to tensile shock loading. To increase versatility of the system to adapt an assembly 30 to the expected demands of a particular circumstance, an absorber unit may be either "high-stretch" absorber unit 32 (e.g., FIG. 2) or a "low-stretch" absorber unit 32' (e.g., as seen in FIG. 3C).

An exemplary low-stretch absorber unit 32' is molded from polyurethane elastomer with a tensile strength of about 6,400 psi, and potentially capable of about 430% elongation. Such a low-stretch absorber unit 32' preferably is nominally about eight inches long at rest, and between about 0.25 and about 0.31 inches thick (e.g., the intermediate joinder sections 40 may be 0.25 inches thick, while the attachment portions 38 may be about 0.31 inches thick (as seen in FIG. 3A)). An exemplary high-stretch absorber unit 32 is also molded from polyurethane elastomer with a tensile strength of about 5,500 psi, and is capable of about 500% elongation. Such a high-stretch absorber unit 32 also preferably is nominally about eight inches long, and between about 0.24 and about 0.34 inches thick (e.g., the intermediate joinder sections 40 may be 0.24 inches thick, while the attachment portions 38 may be about 0.34 inches thick).

A marked advantage of the invention is that the number and type of absorber units 32 or 32' employed in an absorber assembly 30 can be selected to devise a constructed assembly 30 having a predetermined amount of stretch under a given tensile loading force. An approximate but reliably predictable elongation response accordingly can be set at the time the absorber assembly 30 is compiled. Table 1 immediately below tabulates the amount, in inches, that an absorber assembly 30 composed of a "stack" of one, two, or three low-stretch absorber units 32' may be expected to elongate under a given force. For example, referring to Table 1, an absorber assembly 30 incorporating only a single low-stretch absorber unit 32' (e.g., nominally eight inches long) can be expected to stretch by about two additional inches (to an extended length of ten inches) under a shock force of 2.17 kilonewtons (kN) (490 lbs.). Or, as also shown in Table 1, an absorber assembly 30 featuring three low-stretch absorber units 32' (eight inches long at rest) can be expected to stretch by about seven additional inches (to an extended length of fifteen inches) under a shock force of 11.25 kN (2,530 lbs.).

TABLE 1

STRETCH LENGTH TO TENSION FORCE, LOW-STRETCH ABSORBERS

| Additional Elongation (inches) | Stack of One 8-inch Low-Stretch Absorber Unit | | Stack of Two 8-inch Low-Stretch Absorber Units | | Stack of Three 8-inch Low-Stretch Absorber Units | |
|---|---|---|---|---|---|---|
| 1 | 1.86 kN | 420 lbs. | 3.95 kN | 890 lbs. | 5.91 kN | 1330 lbs. |
| 2 | 2.17 kN | 490 lbs. | 4.75 kN | 1070 lbs. | 7.16 kN | 1610 lbs. |
| 3 | 2.53 kN | 570 lbs. | 5.56 kN | 1250 lbs. | 8.00 kN | 1800 lbs. |
| 4 | 2.84 kN | 640 lbs. | 5.96 kN | 1340 lbs. | 8.8 kN | 1980 lbs. |
| 5 | 3.15 kN | 710 lbs. | 6.45 kN | 1450 lbs. | 9.43 kN | 2120 lbs. |
| 6 | 3.46 kN | 780 lbs. | 6.89 kN | 1550 lbs. | 10.27 kN | 2310 lbs. |
| 7 | 3.78 kN | 850 lbs. | 7.56 kN | 1700 lbs. | 11.25 kN | 2530 lbs. |
| 8 | 3.95 kN | 890 lbs. | 8.05 kN | 1810 lbs. | 12.01 kN | 2700 lbs. |

Any given absorber unit 32 or 32' has a known approximate maximum breaking length. A single low-stretch absorber unit 32' preferably has a minimum breaking strength (rupture failure) of 4.98 kN (1,120 lbs.) and a maximum breaking length of between about 25.5 inches and about 26.5 inches. Thus, a low-stretch absorber unit 32' which has a nominal length (at rest) of about 8 inches, may elongate up to about 26.5 inches before failing. As seen in Table 1, a single low-stretch absorber unit 32' will stretch an additional 8 inches under an 890 lbs. load. Two low-stretch absorber units "stacked" in combination preferably have a minimum breaking strength of 9.29 kN (2,090 lbs.) and the same maximum breaking length of about 25.5 inches to 26.5 inches.

In a like manner generally, Table 2 below tabulates the amount, in inches, that an absorber assembly 30 composed of a "stack" of one, or of two, high-stretch absorber units 32 may be expected to elongate under a given force. For instance, an absorber assembly 30 incorporating a single high-stretch absorber unit 32 (eight inches long at rest) can be expected to stretch by about five additional inches (to an extended length of thirteen inches) under a shock force of 0.75 kilonewtons (kN) (170 lbs.). As also shown in Table 2, an absorber assembly 30 including two high-stretch absorber units 32 (eight inches long at rest) can be expected to stretch by about twenty additional inches (to an extended length of 28 inches) under a shock force of 4.98 kN (1,120 lbs.).

TABLE 2

| Additional Elongation (inches) | Stack of One High-Stretch Absorber Unit | | Stack of Two High-Stretch Absorber Units | |
|---|---|---|---|---|
| 5 | 0.75 kN | 170 lbs. | 1.69 kN | 380 lbs. |
| 10 | 1.06 kN | 240 lbs. | 2.31 kN | 520 lbs. |
| 15 | 2.53 kN | 360 lbs. | 3.46 kN | 780 lbs. |
| 20 | 2.44 kN | 550 lbs. | 4.98 kN | 1120 lbs. |

A single high-stretch absorber unit 32 preferably has a minimum breaking strength (rupture failure) of 3.06 kN (690 lbs.) and a high-stretch absorber unit maximum breaking length of between about 34.0 inches and about 35.0 inches. Two high-stretch absorber units "stacked" in combination preferably have a minimum breaking strength of 6.22 kN (1,400 lbs.) and the same maximum breaking length of about 34.0 inches to 35.0 inches. Table 2 shows that a single high-stretch absorber unit 32 will stretch an additional 20 inches under a 550 lbs. load. From all the foregoing, a person of ordinary skill may selectively "mix and match" from a number of absorber units 32 and/or 32' to assemble a shock absorber assembly 30 having a predetermined elongation and absorption response under an anticipated shock loading force. If an absorber unit 32 fails during use, such failure probably occurs with breakage of the joinder sections 40. During operation of the absorber assembly 30, if the joinder sections 40 fail at all, they likely rupture serially at different times, which contributes to a less sudden or violent failure (with diminished catastrophe).

Figure 6:
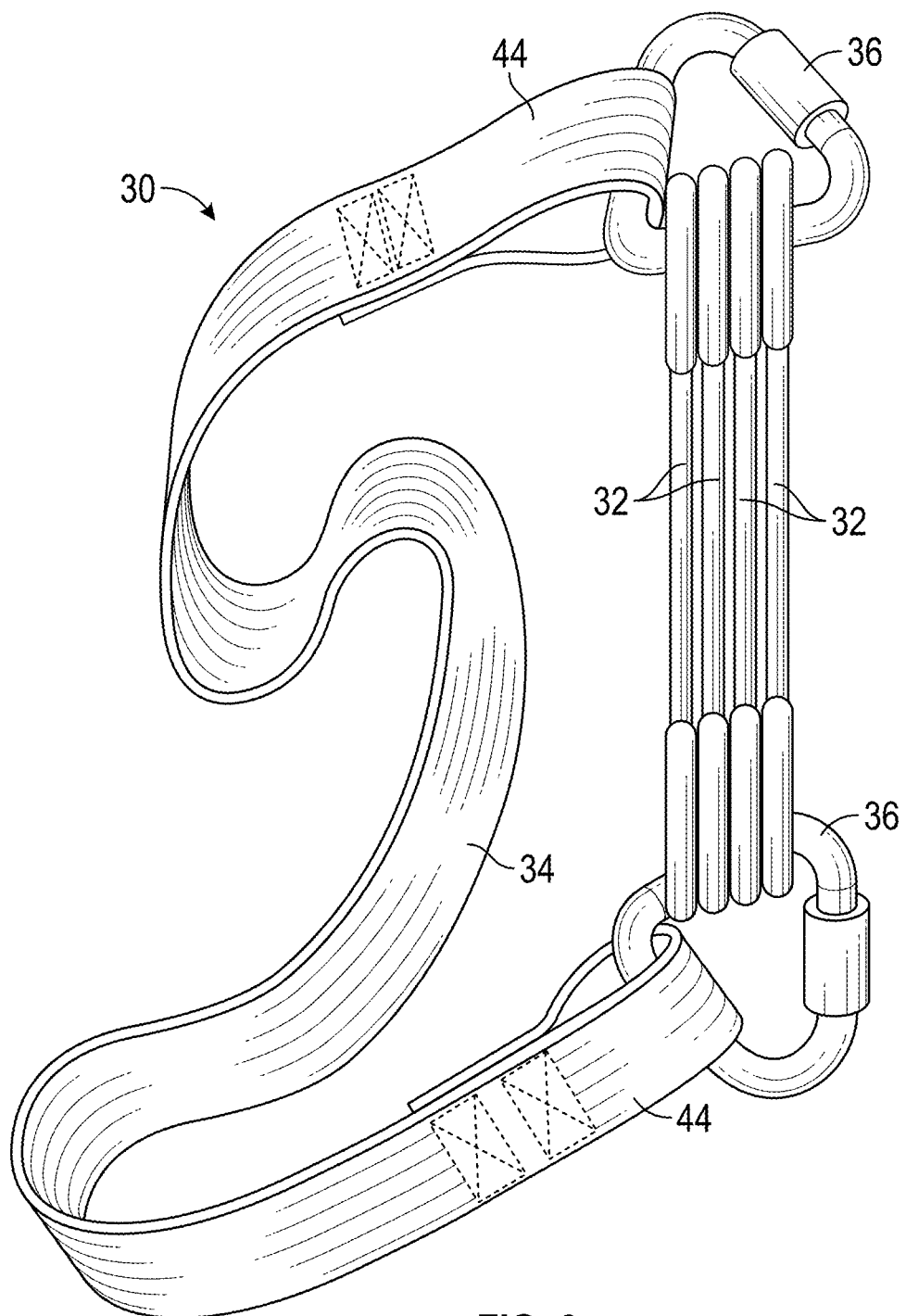
FIG. 6 is an overall view of certain key components of an embodiment of shock absorber assembly according to the present invention, with four absorber units and an unfolded limiter strap connected between two connectors (carabiners)
Figure 7:
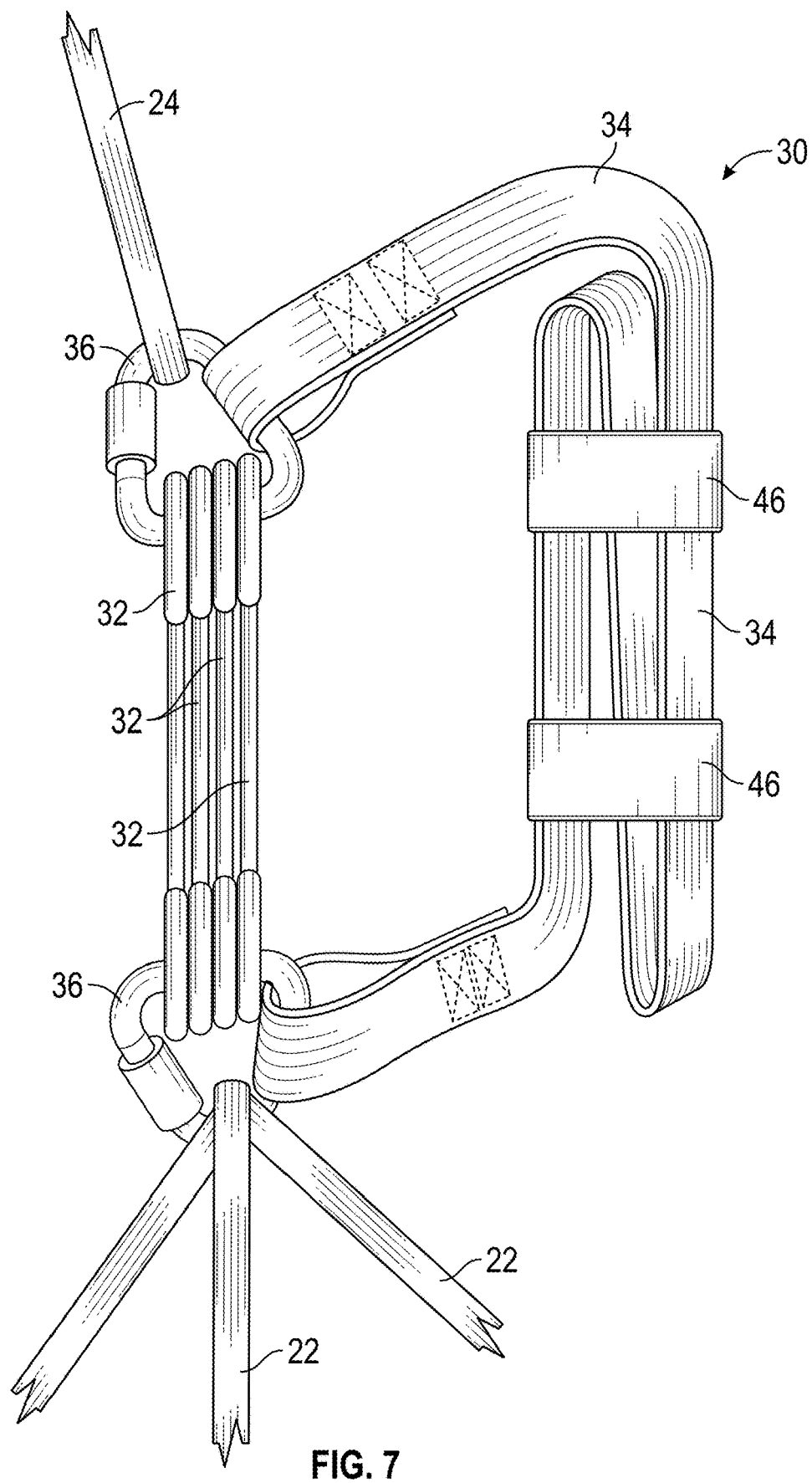
FIG. 7 is an overall view of the embodiment of shock absorber assembly seen in FIG. 6, configured for use with the absorber units unstretched and the limiter strap held in a furled condition, with the shock absorber assembly engaged between a cargo multi-strap harness and a cargo tether.

Also included in the absorber assembly 30 is a limiter strap 34 seen in FIGS. 4A-C and also depicted basically and diagrammatically in FIGS. 6 and 7. The limiter strap 34 is a "backup" to the absorber units 32, 32', serving to prevent the separation of the cargo 20 from the paratrooper 15 in the unlikely event that all the absorber units in an assembly 30 rupture and completely fail during the course of a jump. The limiter strap 34 preferably is a woven nylon web strap, sewn to define a fastener loop 44 at each end thereof. The two loops 44 when opened may have diameters of, for example, about 1.5 to about 2 inches. The reinforcing sewing 48 is according to known techniques and ratings to maintain the functional strength of the limiter strap 34. As suggested in FIG. 4C, each of the two loops 44, at opposite ends of the limier strap, may also have a sewn reinforcement 45 at its extremity. The limiter strap 34 preferably is mildly stretchable, and has an ultimate breaking strength of at least 6,000 lbs. and very preferably at least 10,000 lbs. (about 45 kN). The limiter strap 34 may be about 1.75 inches wide.

Referring still to FIG. 4A, in a preferred embodiment the limiter strap 34 has a nominal length L of approximately 17.5 inches, with a maximally extended (stretched while under tensile loading) length of about 19.5 inches. It is noted, therefore, that the maximum length of the limiter strap 34 is less than the maximum breaking length of a single high-stretch absorber unit 32 (i.e., 19.5 inches is less than 35 inches), and is also less than the maximum breaking length of a single low-stretch absorber unit 32' (i.e., 19.5 inches is less than 26.5 inches). (As set forth in Table 1, a single low-stretch absorber unit 32' extends to 16 inches (nominal eight inches length plus eight inches additional stretch under an 890 lbs. load, while Table 2 reveals that a single high-stretch absorber unit 32 extends to 28 inches (nominal eight inches length plus 20 inches additional stretch under a 550 lbs. load).) Thus, the limiter strap 34, as a component of the complete absorber assembly 30, prevents the absorber units 32, and/or 32' from stretching to their respective maximum breaking lengths. (When the limiter strap 34 is fully extended to its maximum length, loads are transmitted between the pair of carabiners 36 by the limiter strap 34, not by the absorber unit(s) 32, 32'.) The limiter strap 34 thus safeguards against failure of the absorber units of an absorber assembly 30 during use.

FIG. 6 illustrates a fundamental absorber assembly 30. The limiter strap 34 and the (e.g., in FIG. 6, four) absorber units 32 are operatively interconnected by means of the pair of carabiners 36. A first carabiner 36 is opened, disposed through a first loop 44 on one end of the limiter strap 34, inserted through the fastener aperture(s) 42 in first end attachment portion(s) 38 of one or more absorber units 32, and then securely closed so to reliably connect the first end of the limiter strap to the first ends of the absorber units. (In a preferred embodiment of the assembly 30, three absorber units 32 are deployed, but the number of absorber units is selected by the user to suit the circumstance of use.) The second, other, carabiner 36 is opened, disposed through the other, second, loop 44 on the second end of the limiter strap 34, inserted through the other fastener aperture(s) 42 in second end attachment portion(s) 38 of the one or more absorber units 32, and also securely closed so to connect the second end of the limiter strap to the second ends of the absorber units. The limiter strap 34 at this point is slack and flaccid in relation to the absorber units 32. (Again, the overall length (e.g., 25 inches) of the limiter strap 34 exceeds the normal unstretched lengths (e.g., 8 inches) of the absorber units 32.

For use in a jump, it is preferable that the limiter strap 34 be bundled alongside the absorber units 32 so as not to freely flap about or snag on objects. Accordingly, it is preferred that the limiter strap 34 be folded, wadded, or otherwise clumped into a compact bale, and so maintained, until needed. Attention is invited to FIG. 7, illustrating an absorber assembly 30 as configured for use in cooperation with the cargo tether 24 and the cargo harness 22 (or another suitable anchor directly upon the cargo 20). (See also FIG. 1.)

FIG. 7 shows that the limiter strap 34 in a completed absorber assembly 30 preferably is doubled or Z-folded at least one or two times, concertina-like, against itself into compact bale. The term "compact" here suggests that the limiter strap is folded one or more times in a serpentine manner so that its nominal length is reduced to an apparent length roughly approximating the shorter nominal length of an absorber unit. For example, about 9.5 to 10 inches of "slack" in the limiter strap 34 is doubled back on itself, so that the strap compact bale has a reduced apparent length of about eight inches, which is about the same length as the absorber units 32. So configured, the limiter strap 34 is unobtrusive, and promotes the overall compact size and easy manipulation of the complete absorber assembly 30 in use.

There preferably is provided means for releasably maintaining the folded limiter strap 34 in the compact bale. For example, one or more bands 46 of frangible or tearable tapes or strips composed of any readily breakable material (e.g., rubber, plastic, lightweight fabric or polymer, paper, or the like) may serve as such means for releasably maintaining. The frangible holder bands or strips 46 are wrapped around the limiter strap bale, and maintain its compact condition until such time as the absorber units 32 are significantly stretched. When the absorber units 32 elastically elongate substantially—as during their function to absorb a tensile shock transmitted to the absorber assembly 30 from the harness 22 and/or tether 24—the holder bands 46 break or loosen, thereby freeing the limiter strap 34 to unfold and extend toward its full functional length L. Again, the exact composition or dimensions of the bands 46 is not critical, provided that the bands hold the limiter strap 34 in its compact condition during storage and ordinary handling prior to a parachute jump, but are capable of being rent by the forces transmitted to the limiter strap associated with the elongation of the absorber units 32 during shock absorption.

Alternatively to the use of separate holder bands 46, the z-folded limiter strap 34 may be maintained as a compact bale by means of stitching. In this version of the releasably maintaining means, the strap 34 is doubly folded against itself as suggested by FIG. 7, and the overlapping portions or segments thereof are sewn together with frangible thread. The stitching through the overlapped sections of the limiter strap 34 manifests adequate strength to maintain temporarily the compact bale during normal handling prior to a parachute jump, but (similarly to the bands 46) are capable of being rent, ruptured, or displaced the by forces imparted to the strap 34 during the function of the absorber units 32.

Attention is returned to FIGS. 4A-C, which depict a preferred means for releasably maintaining the folded limiter strap 34 in the compact bale. This embodiment has a limiter strap 34 and wrap flap 47 assemblage for use in a shock absorber assembly 30. In this preferred embodiment, the limiter strap 34 is accompanied by a wrap flap 47. An edge of the wrap flap 47 is sewn or otherwise secured along a substantial portion (e.g., about 5.75 inches to about 6.5 inches) of the length L of the limiter strap 34, as indicated in FIGS. 4A and 4C. The wrap flap 47 may have dimensions of about 6.5 inches (corresponding to its juncture with the limiter strap 34) and about 10.5 inches (extending perpendicularly from the strap), and may be composed of 400 denier pack cloth. The wrap flap 47 is provided along the outer edge of its first side with a first fastener 49, and at an intermediate position upon its second side (underside in FIG. 4A) with a complementary second fastener 49'. The fasteners 49, 49' preferably are complementary hook-and-loop fabric fasteners, such as VELCRO® fasteners, permitting the first side of the wrap flap 47 to be releasably fastened to its second side, as described further herein. Alternative kinds of releasable fastener means, such as selected types of ball-and-socket snaps, may also be adapted to the apparatus.

In the preferred embodiment of FIGS. 4A-C, the wrap flap 47 serves the purpose of the holder band(s) 46 described previously in consideration of FIG. 7; i.e., when rolled up and releasably secured by its fasteners 49, 49', the flap 47 temporarily holds the limiter strap 34 in a folded bundle until it is deployed during use of the shock absorber assembly 30 (when the absorber units 32, 32' undergo absorbing stretch). Furthermore, when wrapped around the absorber units 32, 32', the flap 47 protects the absorber units against damage and the elements (sunlight, cold).

Figure 5A:
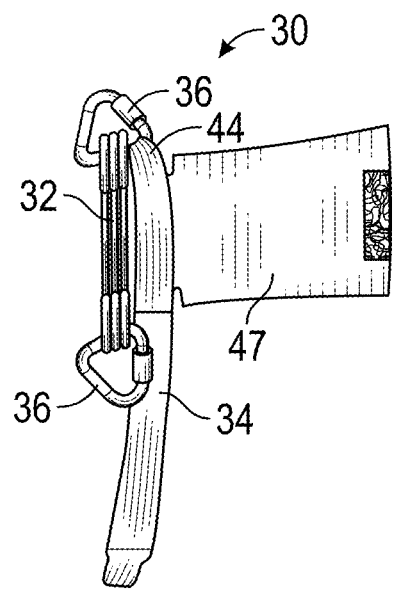
FIG. 5A is a plan view of a preferred embodiment of a shock absorber assembly according to the system and apparatus of the present invention, showing three absorber units disposed between a pair of connectors, together with a limiter strap and wrap flap assemblage, and with a first connector disposed through a first looped end of the limiter strap.
Figure 5B:
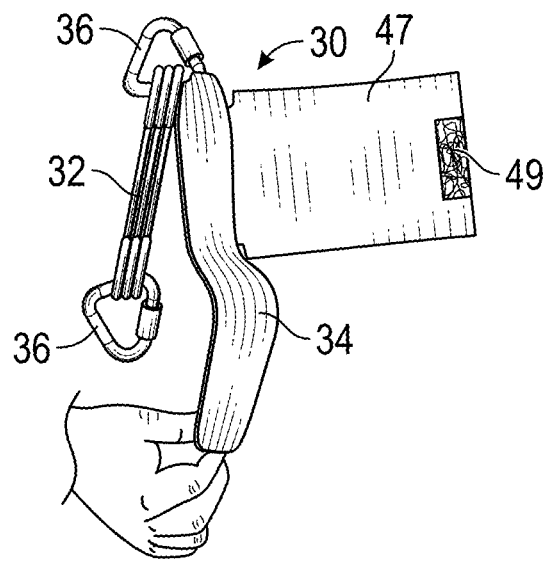
FIG. 5B is a plan view of the shock absorber assembly seen in FIG. 5A, illustrating a folding of the limiter strap against itself to prepare the absorber assembly for use.
Figure 5C:
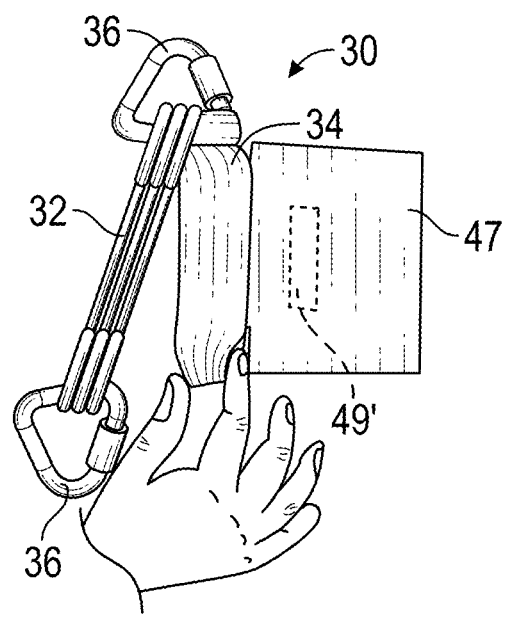
FIG. 5C is a plan view of the shock absorber assembly seen in FIG. 5B, illustrating a further double folding of the limiter strap into a "Z" or "S" arrangement to prepare the absorber assembly for use.
Figure 5D:
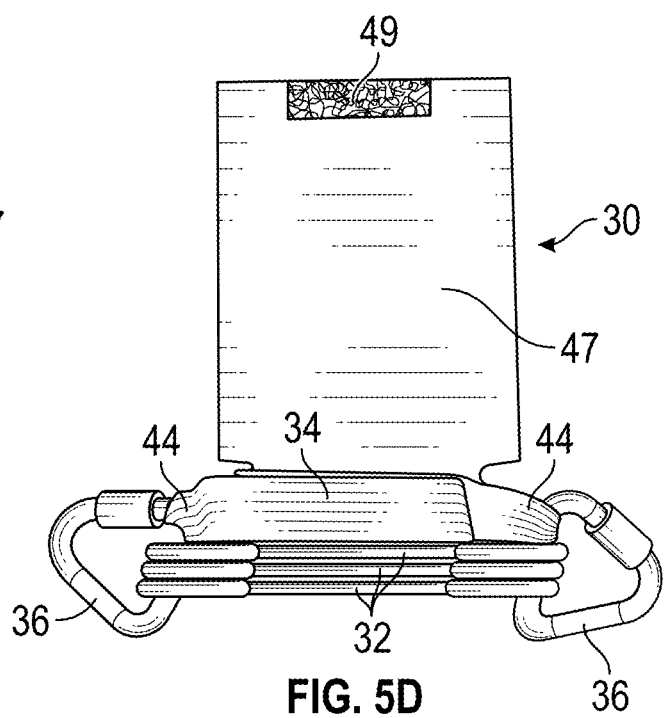
FIG. 5D is a plan view of the shock absorber assembly seen in FIG. 5C, showing that the limiter strap is fully folded, and a second connector is engaged through a second looped end of the limiter strap for use.
Figure 5E:
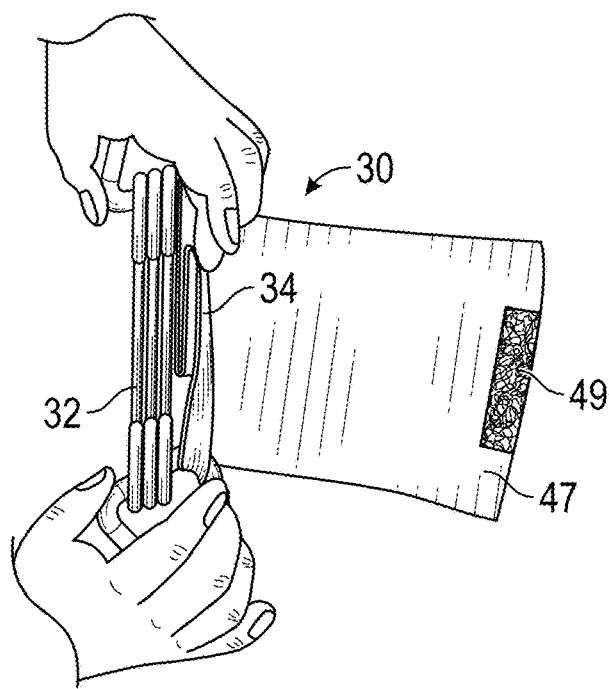
FIG. 5E is a plan view of the shock absorber assembly seen in FIG. 5D, showing the beginning of a rolling of the absorber units, connectors, and limiter strap within the wrap flap.
Figure 5F:
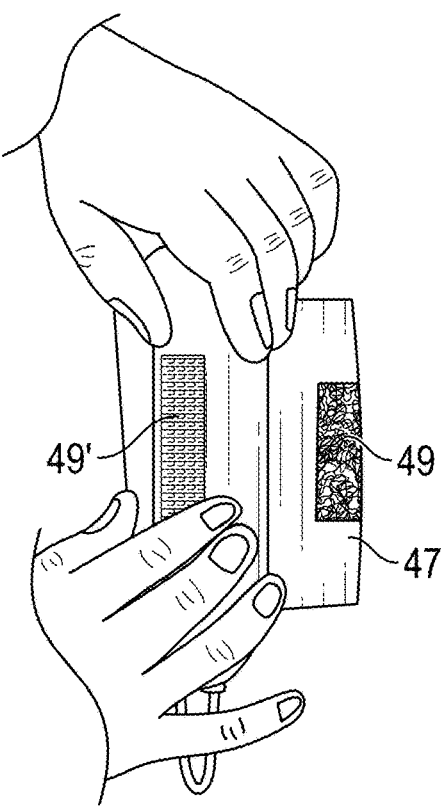
FIG. 5F shows that, per FIG. 5E, the rolling of the absorber units and limiter strap within the wrap flap is nearly completed, so that the absorber units and folded limiter strap are enveloped within the wrap flap and such that a complementary pair of hook-and-loop fabric fastening strips are about to be brought into fasting contact.
Figure 5G:
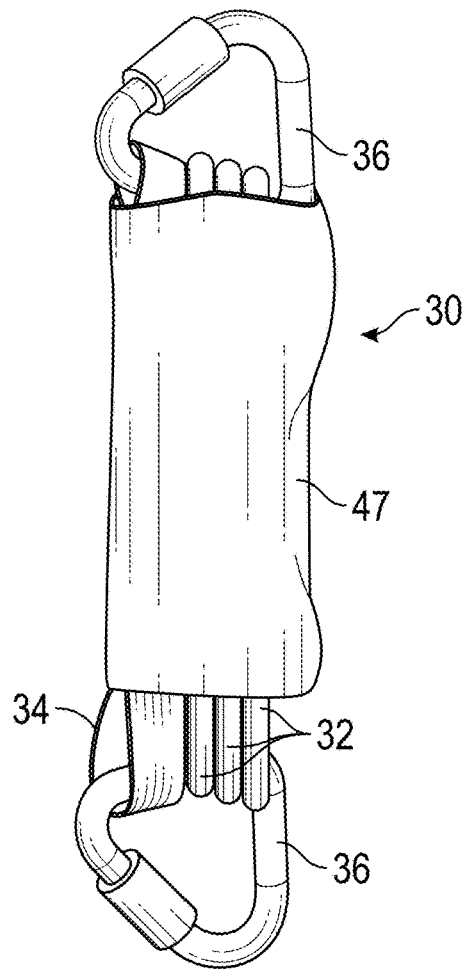
FIG. 5G is a view of the shock absorber assembly of FIGS. 5A-F arranged for use according to the invention, illustrating that the absorber units and folded limiter strap are wrapped within the wrap flap, the wrap flap temporarily held by releasable fasteners, and with the connectors available for use.

FIGS. 5A-G are temporally serial views of the limiter strap and wrap flap assemblage of FIGS. 4A-C as utilized to compile a shock absorber assembly 30 for ultimate use. The wrap flap 47 is wrapped around a folded limiter strap 34 and absorber units 32 (three units shown) to provide a completed and bundled shock absorber assembly 30. Referring to FIG. 5A, it is seen that three absorber units (32 and/or 32') are disposed between two carabiners 36 as described previously. The limiter strap 34 is unfolded, and the flap 47 is unfurled. A first (upper in FIG. 5A) connector carabiner 36 is disposed through and secured in a first loop of the limiter strap 34. The limiter strap 34 is then folded (without twisting) against itself two times in a "Z" or "S" fold (as discussed previously herein with reference to FIG. 7), as indicated by FIGS. 5B and 5C. In FIG. 5C, the "Z" fold in the limiter strap 34 is being completed, so that the effective length of the strap is about the same as the adjacent length of the wrap flap 47. Then, in FIG. 5D, the second, "bottom", carabiner 36 is releasably but reliably engaged through the other or second, bottom end loop 44 of the limiter strap 34. FIG. 5E shows that the user then rolls the folded strap 34 and absorber units 32, 32', together with the pair of carabiners 36, within the flap 47. The rolling action is continued thereby to wrap the flap 47 around the bundled limiter strap and absorber units, as indicated in FIG. 5F. When the wrap is completed, the first fastener 49 and second fastener 49' are brought into adjacent contact (incipiently suggested in FIG. 5F) and engaged together to releasably maintain the flap 47 in its position enveloping the limiter strap 34 and absorber units 32, 32'. FIG. 5G shows the shock absorber assembly 30 wrapped into a compiled bundle; the VELCRO strips on the flap 47 are engaged together to hold together the entire bundle including the carabiners 36, strap 34, and plurality of absorber units 32, 32'.

It is understood that when a shock absorber assembly 30 according to the embodiment of FIGS. 4A-C and FIGS. 5A-G is activated during a jump or fall, the fasteners 49, 49' disengage and separate to permit the wrap flap 47 to unfurl, and the limiter strap 34 to unfold and extend, and the absorber units 32, 32' to stretch, as shall now be further explained.

Reference is returned to FIG. 7. It is seen there that the completed absorber assembly 30 is installed for use between the cargo tether 24 and the cargo harness 22. The absorber assembly 30 preferably but not necessarily is situated for use in the vicinity of the location SA identified in FIG. 1. The operative connection of the absorber assembly 30 to the cargo tether 24 is by means of the first, upper, carabiner 36 in FIG. 7; the carabiner 36 being disposed through and closed around a secure terminal loop (or other suitably reliable attachment) in the tether 24. Similarly, the operative connection of the absorber assembly 30 to the cargo harness 24 is by means of the second, lower, carabiner 36, the second carabiner 36 being disposed through, and closed around, terminal loop(s) in the harness 22 (or by other suitably reliable attachment to some anchor or connection on the cargo 20). A suitable, adequately rated swivel connector (not shown) may be connected inline between the cargo tether 24 and the upper carabiner 36 to reduce undesirable twisting during use, if desired. Similarly or alternatively, a swivel may be connected between the cargo harness 22 and the second lower carabiner 36.

Figure 8:
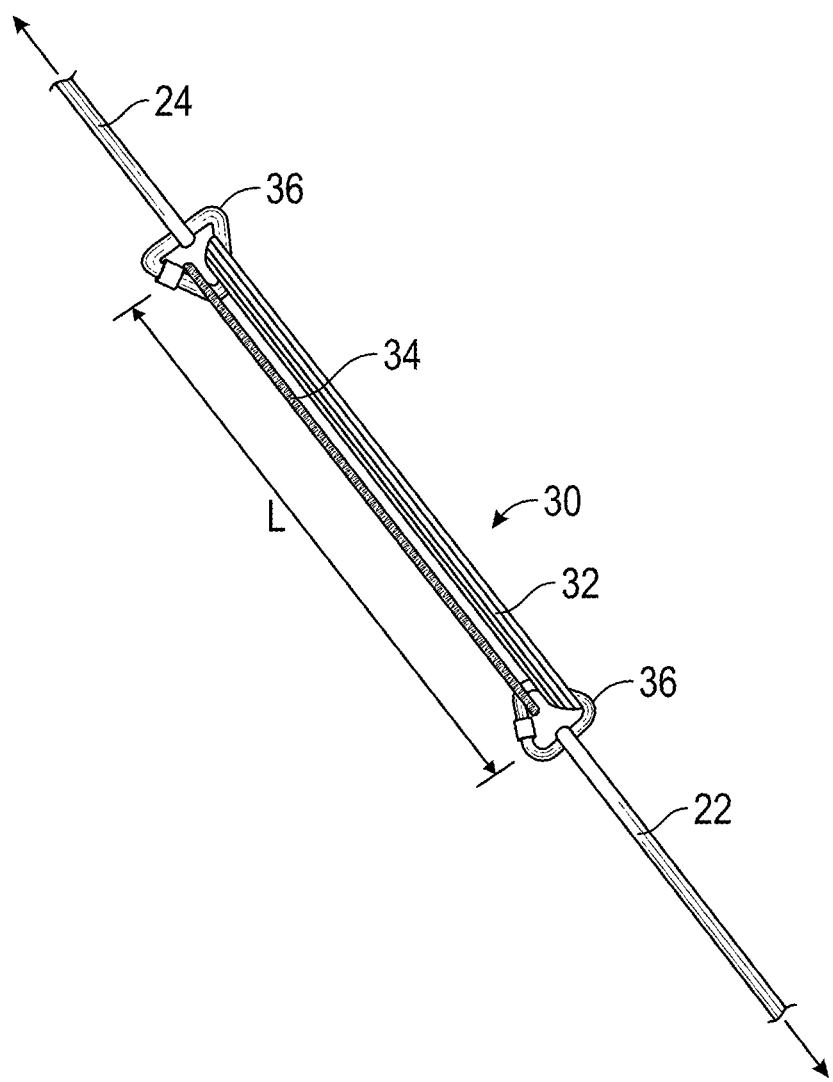
FIG. 8 is a side view of a version of shock absorber assembly according to the present invention, shown stretched out while absorbing a shock, with absorber units elongated and the limiter strap unfurled, the assembly engaged between a cargo multi-strap harness and a cargo tether.

A primary function of the shock absorber assembly 30 apparatus according to this disclosure is illustrated by FIG. 8. When a shock due to and during a tethered tandem cargo parachute jump creates/increases tension in either the cargo harness 22 or the cargo tether 24 or (normally) both of them, the force is transmitted to and absorbed or ameliorated, at least in part, by the absorber assembly 30. The shock force(s) are depicted by the directional arrows associated with the cargo harness and cargo tether in FIG. 8. Shock forces are imparted to both the cargo tether 24 and the cargo harness 22, not necessarily precisely simultaneously, but nearly concurrently and surely in rapid succession. Such forces inevitably are transmitted from the tether 24 to the parachuting user 15 via his or her harness.

When tensile shock is transmitted from the cargo harness 22 and/or the cargo tether 24 to the absorber assembly 30, the absorber units 32, 32' receive the forces (via the carabiners 36) and stretch longitudinally to attenuate the shock. The absorber units 32, 32' undergo rapid axial stretching, and may stretch up to nearly their maximum breaking length, as suggested by FIG. 8. As the absorber units 32 and/or 32' stretch, the wrap flap 47 (or, alternatively the holder bands 46 (or holder stitches)) around the baled limiter strap 34 and around the absorber units unfurls (or fail), releasing the limiter strap to freely unfold. In the wrap flap embodiment of FIGS. 4A-C, the flap 47 is wrapped around the folded strap 34 and around the stretchable absorber units 32, 32' and releasably secured by the complementary fasteners 49, 49', until the time when the absorber units stretch under the tensile load thereby to cause the strap to unfold and the complementary fasteners to mutually detach. Thus, when the shock absorber assembly 30 receives its first substantial shock loading, the VELCRO® fasteners 49, 49' mutually detach, causing the flap 47 to unroll and release the limiter strap 34, which can then unfold and fully extend as seen in FIG. 8. Continued loading of the absorber assembly 30 causes the absorber units 32, 32' to continue stretching elastically to reduce the shock forces transmitted to the user 15, his parachute system 10, and to the cargo 20.

In the event the shock force(s) are sufficiently great to strain and lengthen the absorber units 32, 32' to a length exceeding the nominal length L of the limiter strap 34, the limiter strap extends and goes into tension. This condition is indicated in FIG. 8, with the strap 34 and the absorber units 32, 32' all having obtained the limiter strap's nominal length L. As explained hereinabove, the absorber units 32, 32' preferably are specified to have a maximum breaking length that is less than the maximum length of the limiter strap 34. With any additional loading on the shock absorber assembly 30, the limiter strap 34 thereafter extends further up to its maximum length, thereby to prevent any further elongation of the absorber units. At such an instant, continued or additional shock forces are transmitted to and through, and assumed by, the limiter strap 34 in addition to—or in the extreme circumstance of premature failure of all the absorber units, instead of—the absorber units 32. By means of the limiter strap 34 one, some, or typically and preferably all the absorber units 32, 32' are prevented from surpassing their maximum axial breaking length, thereby averting their rupture. Moreover, in the unfortunate event all the absorber units 32, 32' break under an extreme tensile load, the much stronger (e.g., rated strength 10,000 lbs.) limiter strap 34 remains intact to accept and bear the loads formerly borne by the absorber units. The limiter strap 34 thus serves as a failsafe interconnection means between the cargo tether 24 and the cargo harness 22. The limiter strap 34 accordingly safeguards against the cargo 20 becoming entirely detached and separated from the paratrooper 15 in the undesirable event of complete failure the absorber units 32, 32' of the absorber unit 30.

After the shock forces (which may be repeated and of variable magnitude during the course of a single jump) have been absorbed by the absorber units 32, 32', the absorber units (if intact) elastically rebound toward their rest condition and shape (as seen in FIGS. 2 and 3C). So long as the paratrooper 15 is aloft and the weight of the cargo 20 pulls down upon the absorber assembly 30, the absorber units may remain stretched somewhat by the weight of the cargo 20. (The limiter strap 34 is flaccid, if/while the absorber units 32 and/or 32' bear all the weight of the cargo.) At a later time in the jump while the paratrooper 15 is drifting in descent under a full canopy 11, the combined system including the parachute system 10, the paratrooper 15, the tether 24, and the harness 22 and cargo 20 nearly obtain a condition of internal dynamic equilibrium, which continues till the cargo 20 contacts the ground.

After the jump is completed, the shock absorber assembly 30 may subsequently be repaired/restored for re-use by recompiling the limiter strap 34 (i.e., per FIG. 7). For safety reasons, re-use of the absorber assembly, and particularly the absorber units, should be limited (up to about five total jumps, for example) or preferably even avoided due to the repeated strains each use imparts to the components thereof. Regardless of whether any deformations or damage are observed, an absorber system 30 should be retired after a few uses to safeguard against potentially harmful failure.

Figure 9:
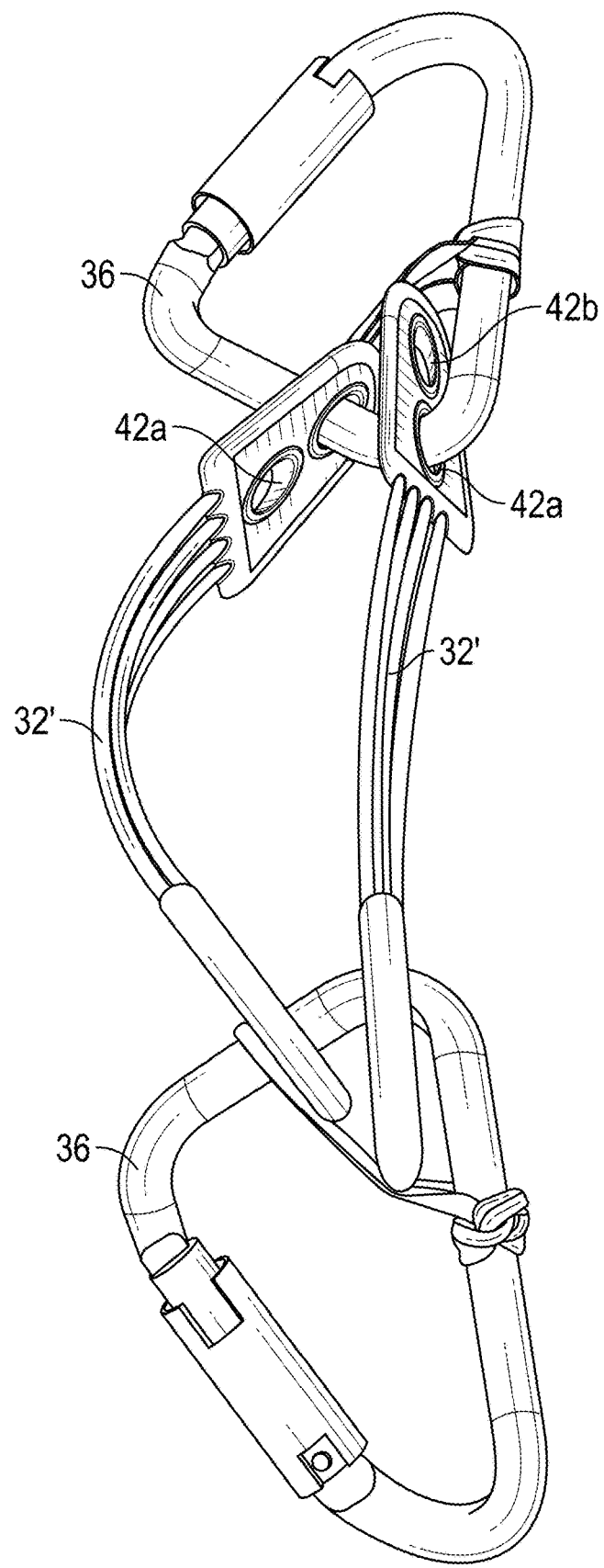
FIG. 9 illustrates a special arrangement of two absorber units between a pair of connectors.
Figure 10:
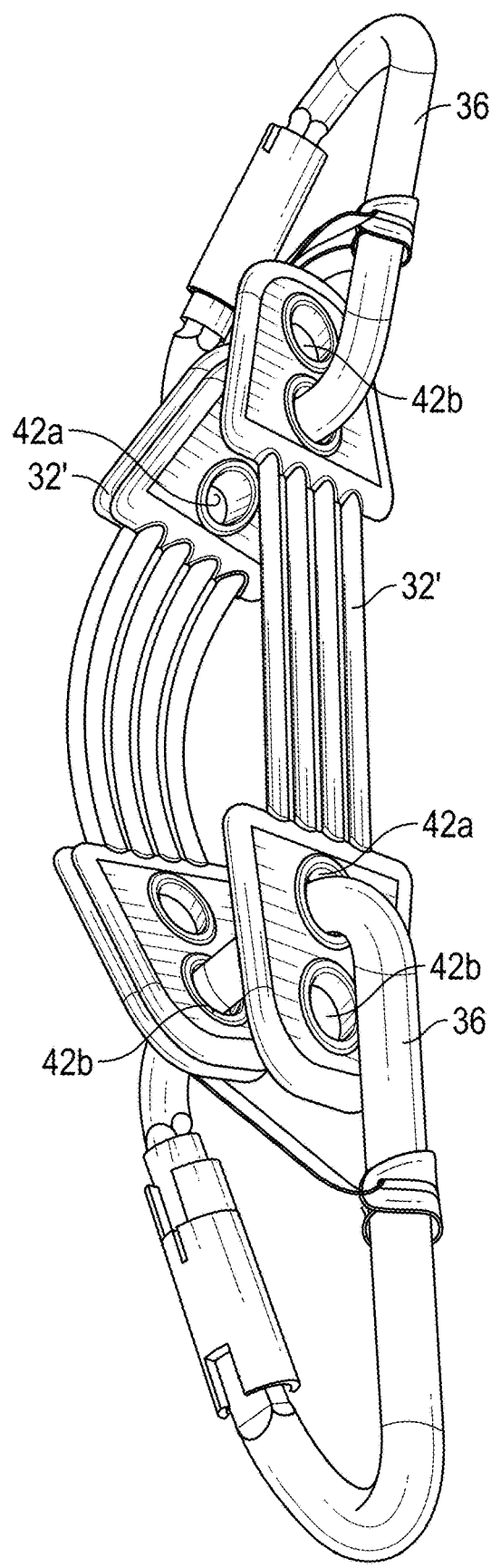
FIG. 10 illustrates a special arrangement of three absorber units between a pair of connectors.

Attention is advanced to FIGS. 9 and 10, showing how the components of a shock absorber assembly 30 may be alternately configured to adapt and account for certain situations. (In FIGS. 9 and 10, the limiter strap 34 and the wrap flap 47 (or frangible holder bands 46) are eliminated from the views of a shock absorber assembly for the sake of clarity of illustration.) Specifically, the absorber units, especially the low-stretch absorber units 32' having four fastener apertures 42a, 42b (see FIG. 3C) can be deployed with carabiners 36 engaged with either the inner fastener apertures 42a or the outer fastener apertures 49b. The versatility of a shock absorber assembly 30 including these variations accordingly is improved, and may be especially adapted to situations where, e.g., a large shock loading is expected to be preceded by one or more relatively milder loads. FIG. 9 illustrates that in a shock absorber assembly, the carabiners 36 are engaged through the two inner fastener apertures 42a of a first absorber unit 32', while the same two carabiners are engaged through the outer fastener apertures 42b of a second absorber unit 32'. Accordingly, when the counterpart shock absorber assembly incorporating the arrangement of FIG. 9 is subjected to tensile loading, the first absorber unit (on the right in FIG. 9) is the first absorber unit to bear and absorb the applied load. Only after the first absorber unit has stretched somewhat under the applied load does the second absorber unit (having the carabiners 36 disposed through its outer fastener apertures 42b) begin also to assume the load. Thus, initial relatively small loads are absorbed only by the first absorber unit, sparing the second absorber unit until the applied load exceeds a certain threshold. Subsequently to such load threshold having been surpassed, both the first and the second absorber units assume and absorb the higher load forces, with the first absorber unit undergoing the comparatively greater strain and stretch.

FIG. 10 depicts a similar arrangement, except that two absorber units 32' (i.e., second and third absorber units) have the carabiners 36 engaged with their aligned outer fastener apertures 42b, while the first absorber unit 32' has the two carabiners engaged inner fastener apertures 42a. The arrangement of FIG. 10 accordingly is adapted to receive and absorb larger subsequent loads after the initial loading absorbed solely by the lone first adapter unit.

The configurations seen in FIGS. 9 and 10 are particularly useful when it is desired to incrementally receive and absorb a series of two or more shock loads of temporally increasing force. The force-to-stretch characteristics of the absorber units 32' may be preselected (e.g., per the data of Table 1 above) to predetermine the overall performance of a completed shock absorber unit 30. An example of practical utility is the case of a tethered tandem bundle jump, where an initial, relatively smaller "tether snatch" force is encountered and felt by a user 15 when the cargo 20 is first released from the aircraft, and is then soon followed by comparatively greater shocks due to canopy "opening shock" and subsequently repeating and varying, but large, load forces generated while the tandem of paratrooper and cargo descend to the ground. The initial tether snatch force may be absorbed by the single first absorber unit 32' only, reserving the actuation and absorptive elongation of the second (and third) absorber units 32' (with carabiners 36 disposed through their outer fastener apertures 42b) for subsequent and greater shocks.

A user may also make selected varying use of the inner 42a or outer 42b fastener apertures, and differing numbers of absorber units 32', in a shock absorber assembly 30 to customize its load bearing capacity or shock absorption response characteristics. By way of further explication, the two-absorber unit arrangement of FIG. 9 may be desirable for use with a tethered tandem cargo 20 of less than 500 lbs. In such an instance, because only the one first absorber unit 32' absorbs the tether snatch force, the user 15 feels a lesser shock than if a stack of two or more (thus less "stretchable") absorber units were concurrently receiving and transmitting to the user the tether snatch force. Yet, the arrangement of FIG. 9 still provides adequate tensile strength and ultimate shock absorption capacity for the increased total loads generated later during the jump. Similarly, the three-absorber unit arrangement of FIG. 10 may be desirable for use with a tethered tandem cargo 20 of greater than 500 lbs. The initial, milder, snatch force is absorbed only by the first absorber unit 32' resulting in a lesser shock to the user, while the second and third absorber units 32' are nonetheless available to receive, in functional combination with the first absorber unit 32', the much greater total loads resulting from larger shocks (e.g., canopy opening shock and later bounces and jolts) generated later during the jump. If necessary, a fourth absorber unit 32' could be added with the carabiners 36 engaged with its outer fastener apertures 42b, to adapt a shock absorber assembly 30 to safely accommodate an even heavier cargo 20.

Testing results for selected ones of the foregoing configurations of the invention are set forth in Table 3 below.

TABLE 3

RESULTS OF DROP TESTS WITH CARGO BARREL WEIGHT 329 LBS.

| Type of Absorber Unit Stack | Average Shock Force of Five Drops (lbs.) | Percent Reduction in Shock Force |
|---|---|---|
| Baseline Drop: No Absorber Units | 4,346.2 | N/A |
| Two Low-Stretch Absorber Units, in Parallel | 3,116.6 | 28.2 |
| Three Low-Stretch Absorber Units, in Parallel | 2,801.6 | 35.5 |
| Three Low-Stretch Absorber Units, in Parallel, No Limiter Strap Employed | 2,148.0 | 50.5 |

RESULTS OF DROP TESTS WITH CARGO BARREL WEIGHT 450 LBS.

| Type of Absorber Unit Stack | Average Shock Force of Three Drops (lbs.) | N/A |
|---|---|---|
| Three Low-Stretch Absorber Units, Parallel | 3,546.6 | 33.90 |
| Three Low-Stretch Absorber Units, in Parallel Using Offset Fastener Apertures | 3,520.0 | 32.9 |

Table 3 illustrates significant real-world reductions in the shock force due to the use of various configurations of the inventive system. A first day of testing involved five test tandem parachute drops with a cargo barrel weight of 329 lbs., with the actual maximum shock force measured for each drop, and then the five maximums averaged. A second day of testing involved three test tandem parachute drops with a cargo barrel weight of 450 lbs., with the actual maximum shock force likewise measured for each drop, and the five maximums averaged to obtain the results set forth in the middle column of Table 3. The "No Limiter Strap Employed" row in Table 3 involved a single drop in which no limiter strap 34 (see, e.g., FIGS. 4A-C) was utilized in the system, and the absorber units were permitted to stretch to or beyond maximum. The "Three Low-Stretch Absorber Units, in Parallel Using Offset Fastener Apertures" row in Table 3 involved three absorber units 32' disposed in parallel, but with two absorber units connected using their inner fastener aperture 42a, and one absorber unit connected using its outer fastener aperture 42b; (see FIGS. 9 and 10 for illustrative guidance in this regard).

Table 3 discloses that the various configurations of the system resulted in shock force reductions of at least 28.2% and up to 50.5%, with many average reductions in the range of from 31.3% to about 35.5%.

Attention it turned to FIG. 11, illustrating the deployment of the shock absorber assembly 30 in an unmanned parachute drop of a cargo 20. The principles disclosed hereinabove with reference to FIGS. 1-10 apply generally in this embodiment of the invention, except that the human user 15 and his personal gear are removed from the system. Rather, the shock absorber assembly 30 as described previously is used to absorb shocks imparted to a cargo 20 of a non-tandem, that is, unmanned, parachute drop. The system 10 includes the canopy 11 and suspension lines 12 as described above, which lines 12 converge to a connection link assembly 80 known or suitable to the art. The cargo tether 24 descends directly from the link assembly 80 to the location SA where the afore-described shock absorber assembly 30 connects (e.g., by a durable loop or link, including optionally a mechanical swivel link) the bottom end of the tether to the collected top ends of the multi-strap harness 22. The distal or bottom ends of the straps of the harness 22 are secured to the cargo 20. For example, the harness 22 may be securely engaged with loops (not shown) attached to the top of a cargo bin or barrel, or to a flexible net-like assembly (not shown) which receives and cradles the cargo 20 in a manner known in the art.

It is apparent, therefore, that the shock absorber assembly 30 is positioned to receive and absorb any of the various shocks (including opening shock, etc.) transmitted from the parachute system to the cargo via the tether 24.

Figure 14:
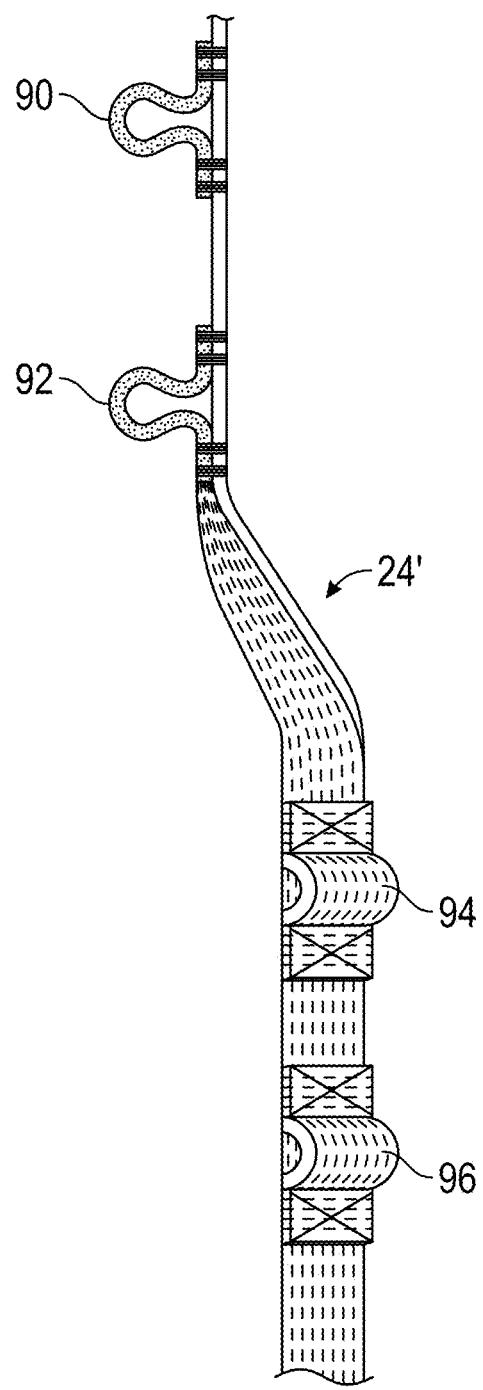
FIG. 14 is a view of an alternative cargo tether usable in the system and method of the invention.
Figure 15:
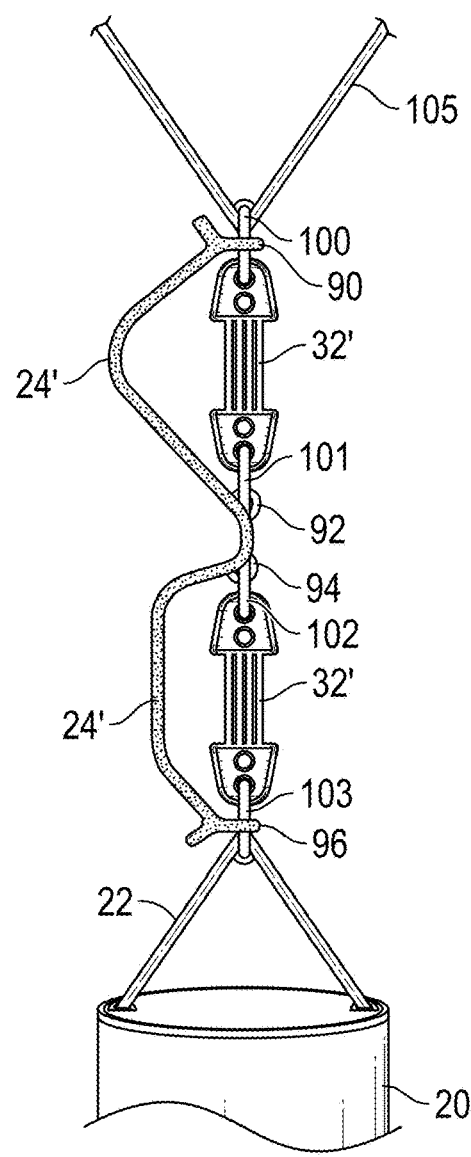
FIG. 15 is a side view of an alternative embodiment of a system according to the present invention, illustrating an alternative beneficial use of the absorber units deployed in a series configuration, i.e., in an "end to end," at least one unit above at least one other.

Attention is advanced to FIG. 15, illustrating an alternative beneficial use of the absorber units 32 and/or 32' described hereinabove. In this embedment, the absorber units 32 and/or 32' are deployed in a series configuration, i.e., in the generally "end to end" serial manner of FIG. 15, at least one unit above at least one other. "Series configuration" means that two or more absorber units are arranged axially in a line, rather than parallel, even though the ends of the absorber units are not necessarily in mutual contact. The series configuration embodiment of FIG. 15, which is to be understood with the foregoing discussions as supporting background, finds particular use in military tethered tandem bundle jumps. This embodiment may dispense with the use of the limiter strap 34 described previously (see FIGS. 1 and 11), and instead includes and utilizes the specially adapted cargo tether 24' shown in FIG. 14. As shown in FIG. 15, the alternative cargo tether 24' (according to the FIG. 14) alternative embodiment is deployed between the paratrooper 15 (more specifically, his or her body harness) and the juncture at location SA in FIG. 1, and thus to the cargo harness 22. In the alternate case of an unmanned cargo drop, the cargo tether 24' of this embodiment is substituted for the tether 24 seen in FIG. 11.

FIG. 14 shows at least a portion of the alternative version of the alternative cargo tether 24'. This alternative cargo tether 24', together with connectors such as carabiners, serves in this alternative embodiment of the invention as a means for maintaining the at least two absorber units 32 and/32' in the series configuration. This cargo tether 24', like the previously mentioned tether 24, is a woven straplike component fabricated from materials, and according to specifications, configurations, and tensile strengths and elasticity, known in the field of tandem bundle parachuting operations. The alternative tether 24' may be of any properly selected length according to circumstance and informed reason, but typically is between about six and about fourteen feet in total length (unstretched, at rest), preferably approximately ten feet (10 feet). (Such lengths are shorter than the typical total length of the tether 24 of the embodiment of FIG. 1.) The cargo tether 24' is provided with a plurality (preferably at least three, even more preferably at least four) of loops fixedly defined or secured serially thereon/therein along at least a segment (e.g., several feet) of its overall length. FIG. 14 depicts four attachment loops 90, 92, 94, 96, but it is to be understood that at least three, and possibly a much greater number may be provided, for example up to eighteen loops total. Each attachment loop defines on the tether 24' a closed loop of, for example between 0.75 inch and about 2.0 inches diameter.

The attachment loops 90, 92, 94, 96 may be and preferably are segments of woven strap securely sewn (per the known art and specifications) to the cargo tether 24' at spaced intervals. As suggested by FIG. 14, they preferably have the same lateral strap width as the tether 24'. A loop, such as upper loop 90 seen in FIG. 14, preferably is provided at or near (within inches of) both ends of the overall tether 24'. An upper such loop at a proximate top end of the tether 24' is used to reliably, but temporarily, engage the tether 24' with a harness tether 105 extending to the user 15, while a bottom-most such loop at or near the distal bottom end of the tether 24' facilitates reliable temporary engagement between the tether 24' and the cargo harness 22. The plurality of at least four attachment loops 90, 92, 94, 96 preferably but not necessarily are situated at regularly spaced intervals along the cargo tether 24'. The spacing distances between loops may be irregular or regular, but preferably are uniformly about equal. A suitable uniform spacing distance between adjacent loops 90, 92, 94, 96 is between approximately three inches (3") and approximately three feet (3'), and preferably is between about two and about three feet (2-3').

Combined reference is made to FIGS. 14 and 15, depicting the use of the system including the use of the alternative cargo tether 24'. FIG. 15 may helpfully be considered with FIGS. 1 and 8 as contextual background. In use, this alternative mode of the invention does not require a limiter strap 34 such as that seen in FIGS. 4A-7. Rather, the alternative tether 24' itself functions as a sort of ultimate limiter, and prevents a loss of a cargo 20 in the event of an unexpected total failure of all the absorber units 32, 32'.

FIG. 15 should be considered in harmony with the foregoing explanations of this disclosure, except that the cargo tether 24' fulfils a function of the limiter strap 34, and the absorber unit(s) are disposed along the alternative tether instead of at the ends of a limiter strap 34. The alternative cargo tether 24' is deployed between a strap or harness tether 105 that is attached to and/or extends in a known manner from the parachute harness secured to the body of the user 15. It is observed in FIG. 15 that the harness tether 105 may extend upward toward the user 15 in a "V" shaped manner with the harness tether having two top connection points (not shown) to the user's harness. (This differs in configuration from the simple straight-line tether 24 seen in FIG. 1.) The bottom loop (e.g., loop 96) at or near the distal end of the cargo tether 24' is secured, as by a properly rated and type of carabiner 103, to an upper part of the cargo bridle 22 (e.g., at location SA in FIG. 1 or FIG. 11). The uppermost loop (e.g., loop 90) at or near the proximate (upper) end of the cargo tether 24' is likewise secured by a properly rated and kind of carabiner 100, preferably a "tri-link" type carabiner (rated, e.g., to 10,000 lbs. breaking), to the bottommost location on the harness tether 105. There may be a fixed loop or connection means in/on the harness tether 105 at the junction point of the top end of the cargo tether 24', through which the top carabiner 100 is linked, by which the top carabiner 100 is prevented against sliding translational movement relative to the harness tether 105. But the installed top carabiner 100 preferably is free to swing or pivot relative to the harness tether 105; it is prevented against shifting movement relative to the harness tether 105. The connection point at location SA is similarly fixed, so that the bottom carabiner 103 can swing or pivot, but does not translate or slide, in relation to the cargo harness 22.

At least one upper absorber unit 32' is connected between two loops (in FIG. 15, loops 90, 92 for example) of the cargo tether 24', preferably by means of carabiners. As seen in the figure, a top carabiner 100 is used to connect a first or upper end of the upper absorber unit 32' to both the uppermost loop 90 and the harness tether 105. The top carabiner 100 is connectably disposed through either of the fastener apertures 42a or 42b (FIG. 3C) in the upper end of the upper absorber unit 32'. (It is to be understood that either type of absorber unit may be selectively employed in the system of FIG. 15, i.e., the absorber unit 32 according to FIG. 2-3B, or a "low-stretch" absorber unit 32' as seen in FIG. 3C). A first intermediate carabiner 101 is used to connect the second or lower end of the upper absorber unit 32' to a first intermediate attachment loop, for example attachment loop 92. It is seen therefore, that the upper absorber unit 32', top carabiner 90, and first intermediate carabiner 101 define a "chain" of components connecting a pair of fastener loops 90, 92 along the cargo tether 24'. In practice, this connected pair of fastener loops 90, 92 may be, but are not necessarily, loops that are mutually adjacent. The first intermediate carabiner 101 is connectably disposed through either of the fastener apertures 42a or 42b (FIG. 3C) in the lower end of the upper absorber unit 32'.

Continued reference is directed to FIG. 15. At least one lower absorber unit 32' is connected between two loops (in FIG. 15, loops 94, 96 for example) of the cargo tether 24', preferably also by means of carabiners. A second intermediate carabiner 102 is used to connect a first or upper end of the lower absorber unit 32' to a second intermediate faster loop 94 on the cargo tether 24'. The second intermediate carabiner 102 is connectably disposed through either of the fastener apertures 42a or 42b (FIG. 3C) in the upper end of the lower absorber unit 32'. (It is understood that either type of absorber unit, high-stretch 32 or low-stretch 32', may be selectively employed as the lower absorber unit in the system of FIG. 15.) A bottom carabiner 103 connects the second or lower end of the lower absorber unit 32' to a bottom attachment loop (e.g., loop 96); the bottom carabiner 103 accordingly interconnects the lower end of the lower absorber unit 103, and the cargo tether 24', and the cargo harness 22. It is seen therefore, that the lower absorber unit 32', bottom carabiner 103, and second intermediate carabiner 102 define another, second, "chain" of components connecting another pair of fastener loops 94, 96 along the cargo tether 24'. In practice, this second connected pair of fastener loops 94, 96 may be, but are not necessarily, loops that are mutually adjacent. The bottom carabiner 103 is connectably disposed through either of the fastener apertures 42a or 42b in the lower end of the lower absorber unit 32'.

While FIGS. 14 and 15 show only four attachment loops 90, 92, 94, 96, this is only for purposes of simplicity of illustration. It is understood that the number of fastener loops can be greater than four. Moreover, it need not be adjacent loops on the cargo tether that are connected by a particular chain of two carabiners and their associated absorber unit. For instance, referring to the example of FIG. 15, there may be one or more additional fastener loops (not shown) affixed to the cargo tether 24' between the upper loop 90 and the first intermediate loop 92. Likewise, there may be one or more additional fastener loops (also not shown in the figure) affixed to the cargo tether 24' between the second intermediate loop 94 and the bottom loop 96. It is noted that two serially adjacent carabiners optionally may share a common fastener loop during selected applications of the invention. For instance, the two intermediate carabiners 101, 102, may both be releasably connected through the single first intermediate fastener loop 92; alternatively, both intermediate carabiners 101, 102, may be releasably connected through the second intermediate fastener loop 94 to leave the first intermediate faster loop 92 unused.

For simplicity of illustration, only two absorber units 32' are shown serially arranged along the cargo tether 24' of FIG. 15. However, more than two absorber units may be deployed in the system. Specifically, there optionally (in many instances preferably) may be two or more upper absorber units 32' disposed between the upper loop 90 and the first intermediate loop 92. Such at least two upper absorber units can be described as provided in a "parallel installation," and their connection between two loops (in FIG. 15, loops 90, 92 for example) is by means of two shared carabiners (e.g., top carabiner 100 and first intermediate carabiner 101) in the manner described hereinabove for the case of a single upper absorber unit 32.

Furthermore, the at least two upper absorber units, in an upper parallel installation forming an upper connection chain, need not be the same type or kind of absorber unit. The two or more upper absorber units in an upper parallel installation may be two high-stretch absorber units 32 (per FIG. 3B), two low stretch absorber units 32' (per FIG. 3C), or one high-stretch absorber unit 32 and one low stretch absorber unit 32'. A third, fourth, or fifth upper absorber unit optionally may be added to the upper parallel installation, according to the circumstantial need for shock absorption.

Similarly, there optionally, in many instances preferably, may be two or more lower absorber units disposed between the second intermediate fastener loop 94 and the bottom fastener loop 96. Such at least two lower absorber units are also provided in a lower parallel installation, and their connection between two loops (in FIG. 15, loops 94, 96 for example) is by means of two shared carabiners (e.g., second intermediate carabiner 102 and bottom carabiner 103) in the manner described hereinabove for the case of a single lower absorber unit. And again, the at least two lower absorber units, in a lower parallel installation forming a lower connection chain, need not be the same type or kind of absorber unit. The two or more lower absorber units may be two high-stretch absorber units 32 (per FIG. 3B), two low stretch absorber units 32' (per FIG. 3C), or one high-stretch absorber unit 32 and one low stretch absorber unit 32'. A third, fourth, or fifth upper absorber unit optionally may be added to the lower parallel installation, according to the circumstantial need for shock absorption.

From the foregoing it is understood that there may be a pair of parallel absorber unit installations that are serially provided along the cargo tether 24'. Two or more parallel upper absorber units 32' (and/or 32) may be serially situated in an upper installation above two or more parallel lower absorber units 32' (and/or 32) along some portion of the length, or the full length, of the cargo tether 24'.

Also, it is understood that that there may be only one multi-absorber unit parallel installation that is serially provided along the cargo tether 24', above or below a single absorber unit 32 or 32'. In such an embodiment, and referring to FIG. 15, there are at least two absorber units connected in parallel between the upper fastener loop 90 and the first intermediate fastener loop 92, but only one absorber unit (32 or 32') connected between the second intermediate fastener loop 94 and the bottom fastener loop 96. The converse may be the alternative case; there may be only one absorber unit (32 or 32') connected between the upper fastener loop 90 and the first intermediate fastener loop 92, and at least two absorber units connected in parallel between the second intermediate fastener loop 94 and the bottom fastener loop 96.

Still furthermore, although not shown in the drawing figures, it will be evident to the person of ordinary skill in the art that there may be more than two parallel absorber unit installations which are serially provided along the cargo tether 24'. For example, an intermediate parallel absorber unit installation (of at least two absorber units) may be situated on the cargo tether 24' between an upper parallel absorber unit installation (of at least two absorber units) and a lower parallel absorber unit installation (also including at least two absorber units).

Further, although not illustrated a person skilled in the art will recognize that there may be more than two chains of two connectors and their associated absorber units arranged serially in the system. For instance, there may be three "chains" of one or more absorber units, and its/their corresponding carabiners, located in series along the tether 24'. The use of the alternative cargo tether 24', and two or more "chains" of absorber units and their associated pairs of carabiners serially disposed along the cargo tether, supply a versatile means for shock absorption in tandem cargo jumps.

Figure 16:
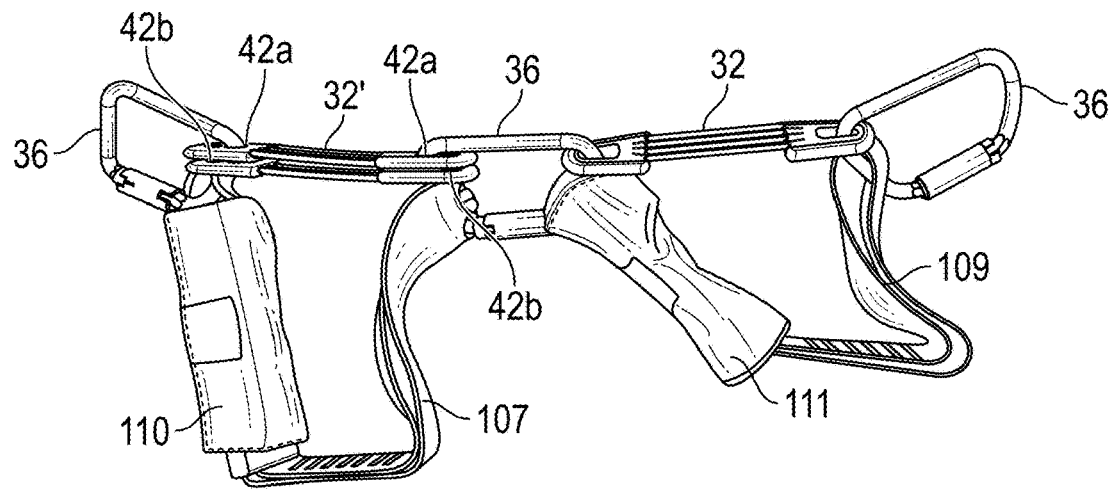
FIG. 16 is another example embodiment of a serial arrangement of chains of two connectors and their associated absorber unit(s), daisy-chained to include two chain tether straps in lieu of the single cargo tether seen in FIG. 15.

Still another example embodiment of a series configuration of chains of at least two connectors and their associated absorber unit(s) is illustrated in FIG. 16. This serial pair of daisy-chained absorber units and carabiners includes two chain tether straps 107 and 109 in lieu of the single cargo tether 24' seen in FIG. 15. The two chain tether straps 107 and 109 together thus serve as part of the means for maintaining the at least two absorber units 32 and/32' in the series configuration. This further alternative embodiment includes at least two absorber units in the series configuration, but as shown in FIG. 16 preferably features two mutually parallel upper absorber units (e.g., a pair of low-stretch absorber units 32') arranged in series with one (or, alternatively, more) lower absorber unit (e.g., a high-stretch absorber unit 32). Three serially disposed connectors, e.g., carabiners 36, interconnect the assembly; an upper carabiner (on the left side of FIG. 16), an intermediate carabiner (central to the figure), and a lower carabiner (on the right side of FIG. 16). The series of absorber units can be linked together by a hard link (intermediate carabiner) or a soft link (adequately rated webbing).

There are also provided two chain tether straps, a top chain tether strap 107 and a bottom chain tether strap 109. Each of the chain tether straps 107 and 109 has, or defines, at both of its ends, an open loop through which a connector, such as a carabiner 36, is releasably engageable. The top chain tether strap 107 may have a length of approximately three feet (3'), while the bottom chain tether strap 109 may have a length of approximately five feet (5'). The chain tether straps 107 and 109 are fabricated from flexible woven strap material, appropriately rated, known in the art. As seen in the figure, the chain tether straps 107 and 109 are also connected in series by means of the carabiners 36. It is evident by comparison with FIG. 15, that in use the top carabiner on the left side of FIG. 16 may correspond (for connection to the harness tether 105) to the top carabiner 100 in FIG. 15, and the bottom carabiner on the right side of FIG. 16 may correspond in use (for connection to the cargo harness 22) to the bottom carabiner 103 of FIG. 15. The intermediate carabiner 36 of FIG. 16 functions as a simple connection in lieu of the connection provided by the combination of the first and second intermediate carabiners 101, 102 and intermediate segment of cargo tether 24' seen in FIG. 15. But the analogies of form and function between the embodiments of serially chained absorber units seen in FIGS. 15 and 16 are readily recognized. A short segment of suitable web strap material, tied in a girth hitch, may be substituted for the intermediate carabiner 36 of FIG. 16.

FIG. 16 shows that prior to the commencement of a jump or drop, respective major portions of chain tether straps 107 and 109 may be, and preferably are, folded or doubled against themselves (perhaps multiply folded in a zig-zag manner) to promote compactness and manageability of the assembly prior to and during the drop. The folded portions of the chain tether straps 107 and 109 may be temporarily maintained in compact bundles by means of respective wrap flaps 110, 111, which releasably envelop the folded portions of the chain tether straps. These wrap flaps 110, 111 are configured and function quite similarly to the wrap flap 47 seen in FIG. 4A though FIG. 5G, and as described hereinabove, including the use of VELCRO® fabric fasteners. Thus, when a shock absorber assembly according to the embodiment of FIG. 16 is activated during a jump or drop, the releasable fabric fasteners (e.g., per fasteners 49, 49' in FIGS. 4A-5G) disengage and separate to permit the wrap flaps 110 and 111, to open, unfurl, and the chain tether straps 107 and 109 to unfold and extend, and the absorber units 32, 32' to stretch. Each of the chain tether straps 107 and 109 in the assembly of FIG. 16 accordingly may be compared, in some respects, to the limiter strap 34 seen in FIGS. 4A-5G. The serially chained assembly of FIG. 16 accordingly may be deployed between the harness tether 105 and the cargo harness 22 as seen in FIG. 15. The upper carabiner 36 (or alternatively the lower carabiner 36) of FIG. 16 is releasably connectable to the harness tether 105, while the lower carabiner 36 (or alternatively the upper carabiner 36) of FIG. 16 is releasably connectable to the cargo harness 22.

The serially chained embodiments of the inventive apparatus and system effectively reduce different levels of hazardous energy by exploiting a chain reaction that resolves a sequential reduction of forces. In the embodiments of FIGS. 14-16, the length of the cargo tether 24' (FIG. 15), or the summed lengths of the chain tether straps 107 and 109 (FIG. 16), is/are longer than the limiter strap 34 seen in FIGS. 4A-5G. Compared to the simple embodiments of FIG. 1 and FIG. 4A through FIG. 8, the serially chained embodiments consequently afford more distance of absorption system "travel" and shock absorptive elongation of the series absorbers, thereby allowing more dynamic absorption of hazardous energy during a given jump or drop.

The daisy chained embodiments of FIGS. 14-16, when shock loaded in tension from top to bottom, undergo and yield to a sort of chain reaction. A primary advantage of these serially chained embodiments is that a chain reactive shock absorption can be predetermined, and adjusted based on the expected shock(s) of a given jump. The adjustment is accomplished by selecting the number (e.g., from one to four) and type (i.e., high-stretch 32 and/or low-stretch 32') of absorber unit provided and any of the two (or more) series chains of the assembly. As mentioned, a serial chain features at least two absorber units in series, and may have two parallel installations of absorber units arranged in series.

For example, when conducting a military tethered tandem bundle jump, the jumper 15 receives different amounts of hazardous energy at different times during the jump (e.g., tether snatch, canopy opening shock, forces transmitted during landing). Therefore, during pre-jump preparation, users assemble the daisy chain gravity force absorber-system of FIGS. 14-15 or FIG. 16 with a pre-selected number and types of shock absorber units (32 and/or 32). The number and types of absorber units are selected based upon the times and magnitudes of the anticipated shocks the user will suffer during the course of the jump. Such information is determined based on, for example, the type of canopy 11 used, the jump altitude, the weight of the cargo 20, etc., as calculated according to principles known in the art. The absorber units are linked one or more above one or more others to form a serial chain. For instance, an upper or top chain may be a high-stretch absorber unit 32 (which requires less energy to pull), can be a parallel installation of two or more absorber units, while the bottom or lower chain may be a low-stretch absorber unit 32' (or may be a parallel installation of two or more absorber units). The chained series of absorber units is restricted between limiter/tether 24', or 107 and 109.

When the jumper 15 exits the aircraft, the first hazardous energy the jumper receives is referred to as the "tether snatch." This tether snatch occurs when the military tethered tandem bundle system is fully extended in tension from a drogue chute to the barrel/load 20. After the tether snatch, the jumper 15 is in free fall until he or she deploys the main parachute. Then, the opening of the parachute canopy 11 causes the user 15 to undergo opening shock (deceleration due to the aerodynamic braking of the parachute). The opening shock ordinarily is the second hazardous energy the jumper receives. Both the tether snatch and the opening shock are considered hazardous energy, and can injure the jumper 15. To reduce these dangerous forces, the daisy chain gravity force absorber system is employed.

The serially chained embodiments of FIGS. 14-16 target individually both tether snatch (less forceful) and opening shock (typically the greatest force experienced by the jumper 15 through his harness). An advantageous chain reaction occurs by triggering a sequential reduction of forces. Because there is, for example, a high-stretch absorber unit 32 in the serially chained assembly, which unit 32 takes less energy to activate, this one (or more) absorber 32 absorbs the tether snatch. Subsequently, when the opening shock occurs, this greater force "triggers" the activation (elongation) of one (or more) low-stretch absorber unit(s) 32'elsewhere (i.e., above or below) in the daisy chain gravity force absorber system. Thus, various absorber units 32 and/or 32' situated at different locations along the serially chained arrangement of absorber units in the assembly are activated at different times during a jump, in correlation with the magnitude of force experienced at a particular time. This results in a chronologically sequential reduction of forces during the overall course of the jump or drop.

The daisy chain gravity force absorber system of FIGS. 14-16 may also be configured such only high-stretch absorber units 32, or only low-stretch absorber units 32' are disposed in the chain assembly, depending on the desired shoch absorption effect. Such an arrangement of uniform types of absorber units reduces hazardous energy by triggering a chain reaction of a sequential reduction of "equal forces," because the absorber units are all the same. There also may is more "distance traveled" (because the failsafe limiter(s) total length is longer) during the operation of the system, allowing greater elastic elongation and permitting increased dynamic absorption of energy.

Human Fall Shock Absorption Generally

A person skilled in the art recognizes that the shock absorber assembly 30 according to this disclosure also may find practical utility in the field of personnel fall shock absorption/attenuation generally. To conduct high angle (steep climb and descent rappel) climbing operations, such as in mountaineering and rock climbing, but also including in tactical assaults or rescues in buildings, or while free rappelling or otherwise descending from an aircraft (such as a helicopter) users (climbers, rescue technicians, military personnel, tactical operators, law enforcement, etc.) may wear a climbing harness system. Falls from the rear openings of military helicopters also are of a concern. Climbing harness systems have been devised for use by recreational climbers, as well as for use by military and law enforcement personnel. Similar requirements arise in the event of urban assaults, searches, and rescues on cliffs or steep mountainous terrain. To perform high angle maneuvers using climbing ropes, a user must be equipped with some sort of climbing belt or harness by which the user removably and controllably engages with the climbing rope or ropes deployed in the operation. There are a wide variety of harnesses and belts known for use in tactical, rescue, and recreational operations. One known type of harness system is disclosed, for example, in my U.S. Pat. No. 6,481,528, the teachings of which are incorporated herein by reference.

The present shock absorber assembly 30 alternatively relates to general industry fall protection. Falls are among the most common causes of serious work-related injuries and deaths. Employers must take measures in their workplaces to prevent employees from falling off overhead platforms, elevated workstations or into holes in the floor and walls.

A person using a rope and harness system may have the long rope attached or anchored, by any of a variety of means or modes, to a secure point, such as on a building, rock, or hovering helicopter. This anchor is, of course, for safety purposes; should the user accidentally fall, his descent is arrested by the rope between his harness and the anchor point becoming taut, so that at the time the fall is stopped, the resulting force of the arrested fall is transmitted from the user to the anchor point. The user does not fall any further than the amount of slack rope between her harness and the anchor point, thus preventing a much longer, potentially fatal, fall. However, at the time the fall is stopped, the user experiences an impact force or "fall force," which force may be significant and potentially harmful.

A safety limit for the fall force is conventionally given to be 12 kN, a limit above which the force can be potentially fatal. It is most desirable to keep the impact or fall force below about 8 kN, above which the force usually causes injury. It is accordingly desirable to provide a shock absorber within the rope and harness system to reduce the magnitude of the fall force felt by the user. The shock absorber assembly 30 accordingly may be adapted and deployed for providing shock absorption in operative combination with a rope system used in climbing, rappelling, and like operations. The climbing ropes are interconnected with a shock absorber assembly 30 as described hereinabove, and which absorbs an impact force in the event of a fall, particularly an accidental fall.

The present invention thus relates also to roping systems, typically including body harness systems such as those worn by rock climbers, or by law enforcement or military personnel, e.g., when rappelling down a cliff/wall or lowering via a rope from a hovering helicopter, and similar circumstances and situations. The shock absorber assembly 30 is adaptable for use in conjunction with an anchored rope, to ameliorate the fall force or impact shock imparted by the rope to a user in the event of a fall, especially an accidental fall. A rope is deployed by a user during a tactical, operational, or possibly recreational situation, to permit a controlled ascent or descent. The rope is attached to an anchor point, so to arrest (with the rope) the user's accidental fall.

When a person falls, his body stores energy. During a fall arrest, this energy is dissipated by elongation of the rope, and focused compression and/or stretching (usually painful, sometimes harmful) of the user's body. (If a belayer person is present, energy also is absorbed by displacement of the belayer's body; however, the present invention finds particularly beneficial use in the absence of a belayer, that is, wherein a single user has his rope connected directly to a fixed anchor point.) Stated succinctly, therefore, energy is transmitted to the belay chain in the form of force. This fall force is called the fall force or impact force. For the user, it is the impact experienced during fall arrest.

We presently are interested in the impact force transmitted to the climber and the redirect point or anchor point. The value of this force relates to all of the important factors in energy absorption, including but not limited to rope elongation and absorption by the climber's body. The impact force on a rope corresponds to the maximum force on the falling user. It may be calculated for various hypothetical falls by measuring a maximum force imparted to a metal mass under standard test conditions (impact force standards). It is desirable to minimize the fall force felt by the user at the time his fall is arrested.

Also of interest is the "theoretical fall factor," a concept and principle known in the art. The fall factor is often used to quantify the severity of a climbing fall. The fall factor is the ratio of fall length to rope length. A theoretical fall factor $F_{th}$ is calculated using the formula:

$$F_{th} = \frac{\text{Fall length}}{\text{Rope length}}$$

where "Fall length" is the length of the climber's fall, and "Rope length" is length of rope available or paid out between the anchor point and the climber. Additional information regarding fall factors and the calculation of fall factor can be found at, for example, https://www.bergfreunde.eu/fall-factor-calculator and https://www.petzl.com/US/en/Sport/Fall-factor-and-impact-force. The object of the present invention is to provide a means and mode for reducing the impact force felt by a user at a fall arrest, without regard for the fall factor of a given fall.

Figure 12:
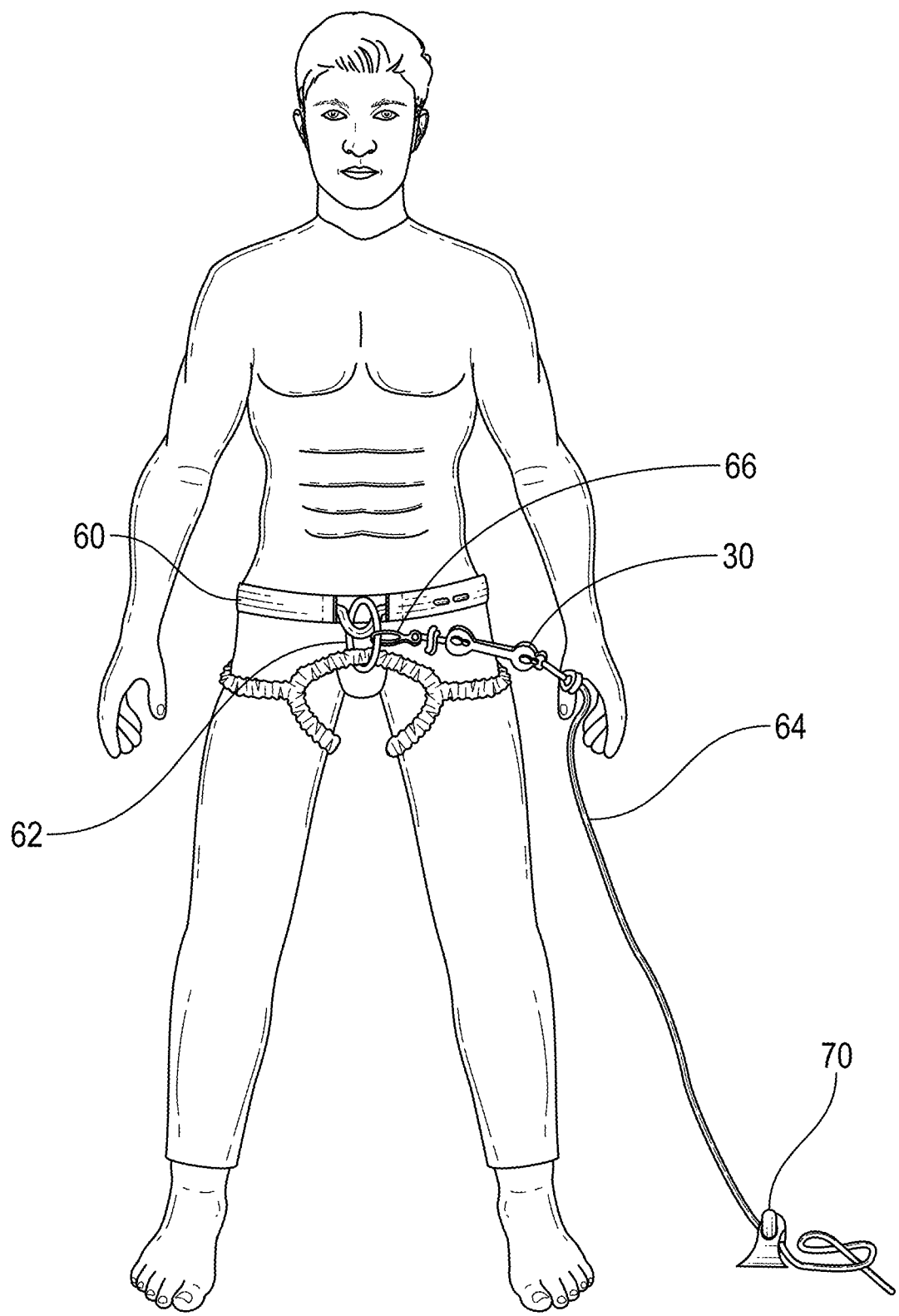
FIG. 12 is a front view of a user with a system according to the present invention, there being a rope for securing the user to a safety anchor point, and including a shock absorber assembly configured for use to absorb the shock of a user's fall.

Attention is invited to FIG. 12, showing the invention configured for use for human fall shock absorption. The user is depicted wearing a climbing harness of a type known in the art, including a waist belt or strap and thigh straps, as seen in the figure. The harness includes a belt 60 having a central front secure loop, to which a rated carabiner 62 is removably but severely connected according to convention. The user employs a rope 64 to attach himself to an anchor point 70. The anchor point 70 is seen in FIG. 12 to be fixed to a floor or ground surface, but as readily may be overhead to the user; the present apparatus and system finds beneficial use with an anchor point fixed at nearly any height relative to the user. The rope 64 is for safety against an accidental fall by the user. It is noted, however, that the rope 64 may be, due to the user's preference in the circumstance, of a type that is comparatively stretch-resistant (such as an aramid fiber rope—not always in common use in roped tactical operations). The rope 64 may be, by way of non-limiting example, a Technora® rope of 9.5 mm diameter. Stretch-resistant rope contributes near no shock absorption in the event of a fall, so the use of the presently disclosed system is advantageously suggested with such a rope.

This alternative embodiment and usage include the shock absorber assembly 30 to the distal end of which the rope 64 is attached. A quick-release mechanism 66 may be used to connect the proximate end of the shock assembly 30 to the carabiner 62. The quick-release device 66 may be, for example, a "pelican" hook type of quick-release device known in the tactical and recreation rope climbing arts. As shown in FIG. 12, when the shock absorber assembly 30 is in use, the quick-release device 66 is reliably but releasably connected to the rated carabiner 62 that is connected to the harness's main belt loop. In alternative use according to user decision, the quick-release may be releasably connected directly to the harness's main belt loop.

Referring to FIG. 12, therefore, it is seen that in the event the user falls down from his position, his fall is arrested by the rope 64. The resulting fall force is transmitted, by the rope 64, to the user's harness (at the main central loop on waistband or belt 60, via the carabiner 62) and to the anchor point 70, but is ameliorated by the action of the shock absorber system 30 described hereinabove. It is noted that in this mode of use, the shock absorber assembly 30 preferably incorporate only a single absorber unit 32. The tensile rupture strength of an absorber unit 32 employed in this alternative mode and means of fall force shock absorption can be significantly less than 600 lbs. (i.e., at least 600 lbs. in the case for the tandem parachute mode and means), as adapted to the circumstances of particular use.

After a fall has been arrested, the resilient absorber unit 32 rebounds elastically to its former "rest" or standard condition and shape. Thus, the present assembly 30, including the absorber unit 32, is contemplated to be re-usable in serial tactical, industrial, or recreational operations. The shock absorber assembly 30 is ideal in all the mentioned (tactical, industrial, or recreational operations) scenarios not only can it receive multiple falls but will be resistant to saltwater environments from maritime operation, and petrol chemicals leaking from rotary or fix-wing aircrafts, etc.

Figure 13:
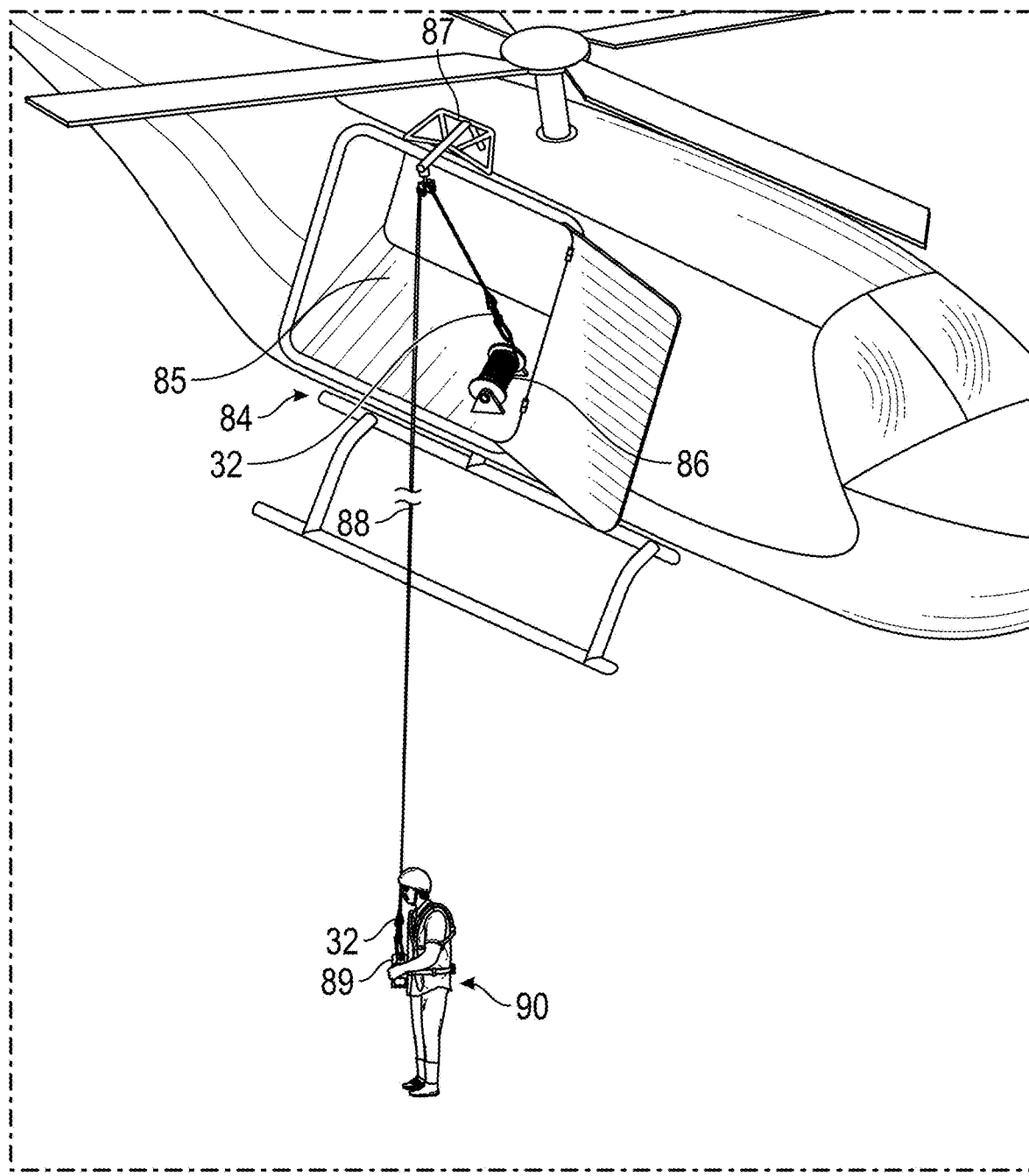
FIG. 13 is a view of an embodiment of the invention in use during a hoisting operation, for instance hoisting to and from a hovering helicopter.

A related but alternative mode of practicing the present invention is illustrated in FIG. 13. Absorber units 32 or 32' are beneficially deployed for use in certain hoisting operations, in which one or more persons (or cargo) is/are lifted or lowered to/from an overhead location by some means. In FIG. 13, the example hoisting operation is undertaken from a stably hovering helicopter 84, a situation encountered in various kinds of military or law enforcement activities, and in a variety of military or civilian rescue operations. FIG. 13 depicts the circumstance where the overhead location is hovering helicopter, more specifically its open door 85, but the practice of the invention is not so limited; the hoisting operation may be from any stable overhead location, such as a ground-based feature (e.g., building, tower, cliffside). The item 90 to be hoisted is shown in the figure as a person, but alternatively may be inanimate cargo. Thus, the hoisted "item" 90 refers to cargo and/or person(s).

The overall context of the inventive hoisting system according to FIG. 13 is known to rescue operations undertaken by, for instance (but not by way of limitation), civilian and military search and rescue. One or more persons (or non-human cargo) 90 are to be controllably lowered from, and/or lifted up to, the helicopter 84 using a length of suitable cord or cable 88. The cable 88 may be a metal fiber cable, or a rope or other cord. The proximate end of the cable 88 is ultimately secured to the interior of the helicopter 84, and typically is spooled about the reel of a motorized winch 86 or other powered means for extending/retracting the cable. The winch 86 may be fixed to the floor of the helicopter interior, or alternatively may be relatively portable and thus reliably but temporarily connected within the aircraft interior. The distal "free" end of the cable 88 is attached to the person 90 or cargo by any suitable means known in the art. Normally, attachment to a person is by a carabiner reliably but releasably connected to a harness worn by the person 90.

Thus the "overhead location" in FIG. 13 is the open door 85 of the helicopter 84, and the item 90 is outside the helicopter for much of the hoisting operation time. There ordinarily may be provided, for example, a hoist bracket 87 in, outside and above, or otherwise adjacent the door opening 85. The bracket 87 typically has at its distal end a slip loop or pulley, as seen in the figure, through which the working cable 88 known for use in such helicopter hoisting operations is disposed. As the winch 86 is controllably operated to "pay out" or extend the spooled cable 88 through the loop or pulley of the bracket 87, the cargo or person 90 is gradually lowered generally vertically down from the door opening 85 toward the ground (or water surface) below the helicopter. Similarly, reversing the regulated operation of the winch 86 retracts the cable 88, resulting in the generally vertical lifting of the person or item 90 upward toward the door 85 of the aircraft 84. (The absorber units of the present invention may be useful, however, in instances where the cable 88 is extended or retracted manually, i.e., by the hands-over-hands and force of person(s) inside the helicopter.)

In addition to, or in lieu of, powered cable extension/retraction by means of an onboard winch 86, a person 90 being hoisted may be equipped with a portable personal "power ascender" device 89 secured to their body (e.g., by his/her harness). Such a motorized, battery-powered, ascender 89 is, in effect, a sort of winching device; the cable 88 is disposed and pulled (in either of two directions) in a specialized manner through the power ascender 89 so to lift or lower the user 90 up or down the length of cable dangling from the helicopter 84 or other overhead location. Power ascenders are known in the art, and may include the power ascenders commercially available from SKYLOTEC North America LP, of Denver, Colorado 80229 USA. SKYLOTEC power ascenders include, e.g., its models ACTSAFE ACX power ascender or the ACTSAFE TCX rope ascender. ATLAS DEVICES, LLC, of Chelmsford, MA 01824 USA, also markets portable power ascenders, such as its ascender series "APA-4" and series "APA-5."

The present invention particularly includes the adapted use of one or more absorber units 32 or 32' in the foregoing hoisting system and operation. Absorber units 32, 32'—as described in previous portions of this disclosure—are beneficially used in such a system particularly when the cable 88 is a "cable" in the usual sense, i.e., a cord of woven wire strands; conventional cable has nearly no capacity for elastic axial stretching under the loads of the person(s) or item 90. Consequently, during hoisting operations, the cable 88 supplies no significant shock absorption for the item 90 due to any bouncing of the item upon the cable caused by wind, the movement of the helicopter 84, or other impacts or forces. Referring still to FIG. 13 it is seen that one or more absorber units 32 or 32' are incorporated on or within the force line which extends along the full length of the cable 88 between the proximate end of the cable (where it is secured to its anchor point on the aircraft, structure, or other overhead location) and the distal end of the cable (where it is attached to the person or item 90). At least one, preferably a plurality, of absorber units 32 or 32' are provided at any number of locations along this force line. Connection of absorber units 32 or 32' to the cable or other components of the hoisting system (e.g., a harness on the person 90) is by suitably reliable means, such as rated carabiners. Preferred examples include the connection (e.g., by a carabiner) of at least one absorber unit 32 or 32' at or near (e.g., within about twelve inches) the person or item 90 near the distal end of the cable 88, or between the distal end of the cable 88 and its connection to the person or item 90, as indicated in the figure. Alternatively, or additionally, at least one absorber unit 32 or 32' may be provided within the force line at or near (e.g., within about twelve inches) the proximate end of the cable 88 at or near its connection to the winch 86 (or in the absence of a winch, its connection to its alternative anchor point), also as suggested in FIG. 13. If the winch 86 is not fixed directly to the floor of the helicopter 84, absorber unit(s) 32, 32' potentially could be provided between such a "portable" winch and the floor of the aircraft. In sum, one or more absorber unit(s) 32, 32' are provided at the two ends of the cable 88, or at selected location(s) within/along the cable, so as to absorb shock forces transmitted along the cable to the person or item 90 during the hoisting operation.

Although the invention has been described in detail with particular reference to these preferred embodiments, other embodiments can achieve the same results. In this description, specific details are set forth, such as specific materials, structures, processes, etc., in order to provide a thorough understanding of the present invention. However, as one having ordinary skill in the art of tandem cargo parachuting would recognize, the present invention can be practiced without resorting strictly only to the details specifically set forth. In other instances, well-known concepts and compositions have not been described in detail, in order not to unnecessarily obscure the present invention.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art and it is intended to cover by the appended claims all such modifications and equivalents.

I claim:

1. A method of fall protection comprising:
    attaching a first end of a rope or cable to a harness for a person or item;
    attaching a second end of the rope or cable to a fixed anchor point, the rope or cable defining a force line extending along a length of the rope or cable between the first end and the second end;
    incorporating within the force line a shock absorber assembly;
    providing the shock absorber assembly with at least one stretchable absorber unit comprising:
        a first end attachment portion;
        a second end attachment portion;
        at least one fastener aperture defined through the first end attachment portion;
        at least one other fastener aperture defined through the second end attachment portion; and
        at least three parallel intermediate joiner sections integrally joining and extending between the first end attachment portion and the second end attachment portion;
    wherein the end attachment portions and the intermediate joiner sections are integrally molded as a single structural unit.

2. The method of claim 1 wherein incorporating within the force line a shock absorber assembly comprises:
    connecting the rope or cable to the at least one fastener aperture defined through the first end attachment portion; and
    connecting the rope or cable to the at least one fastener aperture defined through the second end attachment portion.

3. The method of claim 1 wherein during operation of the shock absorber assembly if the intermediate joiner sections fail they rupture serially at different times.

4. A fall protection system for a person, comprising:
    a rope or cable having a first end and a second end, the second end of the rope or cable attachable to an anchor point fixed at any height relative to the user, the rope or cable defining a force line extending along a length of the rope or cable between the first end and the second end;
    means for attaching the first end of a rope or cable to the person;
    a shock absorber assembly, incorporated within the force line, comprising at least one stretchable absorber unit comprising:
        a first end attachment portion;
        a second end attachment portion;
        at least one fastener aperture defined through the first end attachment portion;
        at least one other fastener aperture defined through the second end attachment portion; and
        at least three parallel intermediate joiner sections integrally joining and extending between the first end attachment portion and the second end attachment portion.

5. The system according to claim 4 wherein the means for attaching the first end of the rope or cable to the person comprises a carabiner engageable with a personal harness or belt on the person.

6. The system according to claim 4 wherein the at least three parallel intermediate joiner sections comprises four cylindrical joiner sections.

7. The system according to claim 4 wherein the at least one stretchable absorber unit comprises a polyurethane absorber unit having a tensile strength of about 6,400 psi and capable of 430% elongation.

8. A fall protection system for an item or person comprising:
- a shock absorber assembly comprising at least one stretchable absorber unit comprised of a thermoplastic elastomer, each of the at least one absorber units further comprising:
  - a first end attachment portion;
  - a second end attachment portion;
  - at least one fastener aperture defined through the first end attachment portion;
  - at least one other fastener aperture defined through the second end attachment portion;
  - at least three parallel intermediate joinder sections integrally joining and extending between the first end attachment portion and the second end attachment portion;
- a first segment of rope or cable having a first end attachable to a secure anchor point, and a second segment of rope or cable, the first and second segments of rope or cable in operative combination with the shock absorber assembly;
- means for connecting a second end of the first segment to the first end attachment portion;
- means for attaching a first end of the second segment to the second end attachment portion; and
- harness means for attaching a second end of the second segment to the person;

wherein when the person falls their descent is arrested by the rope or cable between the harness means and the anchor point becoming taut such that at a time the fall is stopped the resulting force of the arrested fall is transmitted from the person to the anchor point.

9. The fall protection system according to claim 8 wherein the means for connecting a second end of the first segment to the first end attachment portion comprises a first carabiner, and the means for attaching a first end of the second segment to the second end attachment portion comprises a second carabiner.

10. The fall protection system according to claim 9 wherein the means for attaching a second end of the second segment to the person comprises a carabiner engageable with a personal harness or belt.

11. A method of fall protection for a person comprising:
- attaching a rope or cable to a belt or harness on the person;
- attaching the rope or cable to a secure anchor point on a building, aircraft, ground or hoist;
- attaching a shock absorber assembly to the belt or harness;
- attaching the shock absorber assembly to the rope;
- providing the shock absorber assembly with at least one stretchable absorber unit comprising:
  - a first end attachment portion;
  - a second end attachment portion;
  - at least one fastener aperture defined through the first end attachment portion;
  - at least one other fastener aperture defined through the second end attachment portion; and
- promoting the lateral bendability of the absorber unit by providing it with at least three parallel intermediate joinder sections integrally joining and extending between the first end attachment portion and the second end attachment portion, thereby facilitating manipulation of the absorber unit by the person.

\* \* \* \* \*